(12) United States Patent
Mishina et al.

(10) Patent No.: US 6,719,634 B2
(45) Date of Patent: Apr. 13, 2004

(54) IC CARD, TERMINAL DEVICE AND SERVICE MANAGEMENT SERVER

(75) Inventors: Yusuke Mishina, Kunitachi (JP); Hiroko Sukeda, Tokorozawa (JP); Masaru Ohki, Tokorozawa (JP); Naoko Yamazaki, Koganei (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/164,627

(22) Filed: Jun. 10, 2002

(65) Prior Publication Data

US 2002/0155892 A1 Oct. 24, 2002

Related U.S. Application Data

(62) Division of application No. 09/376,009, filed on Aug. 19, 1999, now Pat. No. 6,575,835.

(30) Foreign Application Priority Data

Aug. 26, 1998 (JP) ............................................. 10-239812
Nov. 12, 1998 (JP) ............................................. 10-321684

(51) Int. Cl.[7] ................................................. A63F 9/24
(52) U.S. Cl. ......................................... 463/42; 463/43
(58) Field of Search ............................. 463/16–22, 25, 463/29, 30, 31, 40, 42, 43

(56) References Cited

U.S. PATENT DOCUMENTS 6,203,427 B1 * 3/2001 Walker et al. ................. 463/16
6,234,898 B1 * 5/2001 Belamant et al. ............. 463/25

FOREIGN PATENT DOCUMENTS

| DE | 19609732 | 9/1997 |
|---|---|---|
| JP | 4156876 | 5/1992 |
| JP | 5228259 | 9/1993 |
| JP | 6246069 | 9/1994 |
| JP | 8130728 | 5/1996 |
| JP | 10099544 | 4/1998 |
| JP | 10192483 | 7/1998 |
| JP | 10271562 | 10/1998 |
| JP | 03280979 | 5/2002 |
| WO | 9835309 | 8/1998 |

* cited by examiner

*Primary Examiner*—Kim Nguyen
(74) *Attorney, Agent, or Firm*—Antonelli, Terry, Stout & Kraus, LLP

(57) ABSTRACT

A system for loading, through a shop terminal, a game application into an IC card which disables playing of the game after a plurality of times in the same pattern by invalidating the game pattern when the play is completed and program log data is stored in the IC card. The log data is collected by a management server for each connection of the IC card and the shop terminal so as to administrate the collected data to enable dynamic management of game parameters, thereby the game application may be safely introduced to the IC card system, thereby increasing a user desire to use the card.

15 Claims, 35 Drawing Sheets

Fig. 19

| | name of command | parameter | response | terminal | function |
|---|---|---|---|---|---|
| 401 | LoadGame | game pattern | — | shop terminal | load one game pattern into the smart card |
| 402 | GetUserLog | — | log data | shop terminal | get the log data |
| 403 | GetValue | — | point value | both | get the total point value |
| 404 | SetValue | point value | — | both | set the new point value (new value must be less than current value) |
| 405 | IsLoaded | — | result | both | check if the game sheet loaded |
| 406 | Select1st | selected box number | point | user terminal | select first box and get the point of the box |
| 407 | Select2nd | selected box number | point & game pattern | user terminal | select second box and get results |

IC CARD, TERMINAL DEVICE AND SERVICE MANAGEMENT SERVER

The present application is a divisional application of application Ser. No. 09/376,009, filed Aug. 19, 1999, now U.S. Pat. No. 6,575,835 the contents of which are incorporated herein by reference.

BACKGROUND OF THE INVENTION

1. Field of the Invention

The present invention relates to a computer system of higher security, and particularly to a computer system mainly using an IC card which can store application programs in a non-volatile memory.

2. Description of the Related Art

An IC card (or a smart card) comprising a CPU (Central Processing Unit) in an IC chip is expected for use in various fields because it has sophisticated information memory capability and actualize higher security. Recently, the introduction of the IC card is positively considered in various field including the financial field such as electronic money.

A card OS (Operating System) in which a plurality of applications can be installed safely on a card is generally used. As the OS corresponding to these multi-applications, "MULTOS" by Mondex International Inc. is well known. For the IC card corresponding to a multi-application to be managed by the OS, cooperation of a plurality of applications, for example, cooperation of electronic money and a point system (a system in which point having the worth as money is added depending on use of card, and it may be exchanged later with cash or items), is now discussed. shop, in which when a person makes shopping, he/she is given a game of a paper card (for example, a scratch card) and he/she can get a giveaway depending on the result of such game. A type of a game is diversified, for example, from a simple scratch type game (silver mask is removed to read characters written on the surface) to the game to which a quiz is added. Moreover, a kind of a public lottery is also generally introduced, in which a person purchases a game sheet by payment and he/she can get prize money depending on the result after removing the scratched area.

In regard to the field of the game, a system is formed and is now attracting much attention, in which a participant solves the interactively given game and the quiz on the network represented by the Internet. His name is listed in the ranking managed by the server, or he/she can get a prize depending on the result. In this system, quizzes and game patterns are stored on the server via the network and moreover lists of a question history of a participant, points and results are generally provided in the server.

The IC card corresponding to the multi-application explained above is now at the introduction stage. As the first application, it may be used as electronic money to which security is mainly considered. However, it is not used sufficiently because it is not yet introduced into ordinary users and the card is rather higher in cost than the magnetic stripe card used as the ordinary credit card. In order to sufficiently introduce such a new card system, it is very important to stimulate curiosity of users to "try to use" the card and offer convenience for positive use of the IC card system.

On the other hand, in the sheet type game, there is no problem when the prize or item to be exchanged are rather low prices, but when a result of the game can be exchanged with the high price prize or goods, possibility for alteration and forgery must be considered. Moreover, in the case of games in which object of the game is placed not only to simple stationary data but also to pattern of the game, hitting possibility dynamically changes depending on amount of money in an application, the date, the time or the complicated calculation capability is required, a user may be very much interested in such games, widening the possibility of such games.

In an electronic game via the network, the user cannot enjoy the games if he/she is not in some way connected to the network and when the prize and item given by the game are higher in amount of money, a certain kind of fear for malicious mischief occurs in the security of information on the network.

SUMMARY OF THE INVENTION

Based on the disadvantage of the three related art examples of the IC card corresponding to a multi-application, a sheet type game, and a game on the network, the present invention proposes to overcome the disadvantages of these examples by the installation of the application which may be controlled widely as a game as an application of an IC card.

According to the present invention, a game is distributed to users depending on the application of the card, and users can enjoy the games installed on the IC card in which electronic money and the point system have been installed. Therefore, depending on the result of the game, points having the monetary worth are added and finally such points may be exchanged with the prize or goods. Here, it is also possible to consider the system in which monetary worth obtained as a result of execution of the game is reflected in direct on the electronic money without combined with the point system.

A game is usually diversified into various kinds of games but here according to the present invention the "game" is defined as "an object which has possibility for obtaining different results depending on operation by the user, and the results are not previously known by the user".

In the existing IC card application in the electronic money and the point system, the user makes payment for a certain item as the exchange, points are added on the card depending on use of the card or the points may be exchanged with money or an item based on the predetermined rate. In this case, the distributed value is equivalent in a series of distribution and it is never changed in the expected rate depending on luck or manipulation of the user. On the contrary, since it is essential for higher security that the value is equivalent in a series of distribution, safe operation of card may be assured in place of money. However, in the game system "which has possibility for getting different unexpected results for the user" defined above, the total of values dispersed on each card does not always become equivalent to the total of values issued from the operation side and therefore there rises a risk, depending on the method of operation, for resulting in unexpected over use of the value and loss in the system operation side. Therefore, a system which cannot be found in the existing IC card application is required to introduce the game application into the IC card system.

The system which cannot be found in the existing application can be listed, in more practical, as "the game pattern which has been once executed by the user cannot be executed for a plurality of times under the recognition of the user" and "the system operation side can dynamically control distribution of expected values". In regard to the former, it is considered that the game pattern which has been executed once by the user can immediately be invalidated (deleted in more practical) to prevent execution more than once, and a game execution history data is stored on the card and generation of the game pattern to be loaded to the card next is controlled based on such history data. In regard to the latter, it is considered that history data stored on the card, execution result data on each user and history data on point exchange can be managed as game management data and parameters for game issuance by the system operation side can be dynamically controlled based on such information. Therefore, the users can execute the game which cannot be expected previously and thereby illegal act based on forecasting of the solution can be prevented. Therefore, the system operation side can roughly detect distribution of values in the current system as a whole and can also prevent large loss in the system side by dynamically controlling various parameters of the game.

Therefore, the following eight goods may be listed as means for implementing the present invention. First, as means in the IC card side, (1) Game of the type having game pattern:

A game pattern to obtain the result through comparison with user input is stored in the memory of the IC card and result is determined by comparing this game pattern and user input depending on the predetermined algorithm. The game pattern which has completed reference is immediately invalidated. The user should not be allowed to know previously this game pattern. Therefore, this game pattern is encrypted in many times and is loaded from an external terminal or generated in the card. Moreover, it also has the function for making comparison with log data on the preceding processes at the time when the game pattern is loaded from the external terminal to control the loading of a pattern.

(2) A game of the type having no game pattern and obtaining the result from user input timing:

Execution right data indicating how many times the user can execute the program is stored in the memory of the IC card. Within the range where the execution right exists, the result is determined by the predetermined algorithm which assures different values depending on the user input timing. Upon completion of execution, the execution right data is reduced.

(3) A presentation to the user of a intermediate process of the game:

When single execution of the game is formed of a plurality of user input, intermediate process of the game can be presented for the user and content of presentation of intermediate process can also be changed.

(4) Points can be changed depending on execution of the game:

Depending on the result of the game execution, points of the user may be changed. This point has the value.

Next, as a personal terminal for processing the IC card, (5) Terminal manipulated by the user at his side:

This terminal can be connected with an IC card and has the function to present the intermediate process of the game execution to the user and temporary saving of the game pattern.

(6) A shop terminal for transmitting, to the IC card, game pattern, a game parameter and program execution right data:

This terminal can be connected to the IC card and has the function which is administrated by the system management person and transmits, to the IC card, the game pattern required for game execution, various parameters and game execution right.

(7) A shop terminal for collecting the game execution history:

This terminal has the function to collect the game execution log data stored in the IC card on the occasion of sending the game pattern, various parameters and game execution right, etc. to the IC card.

Finally, as the server for system management, (8) Management server for management of parameters based on the log data:

This server has the function to dynamically conduct management of the game parameters issued on the basis of execution history and other various factors collected from the IC card and shop terminals.

BRIEF DESCRIPTION OF THE DRAWINGS

FIG. 19 illustrates a list of commands to an IC card from a terminal of a scratch game;

DETAILED DESCRIPTION OF THE PREFERRED EMBODIMENTS

Figure 1:
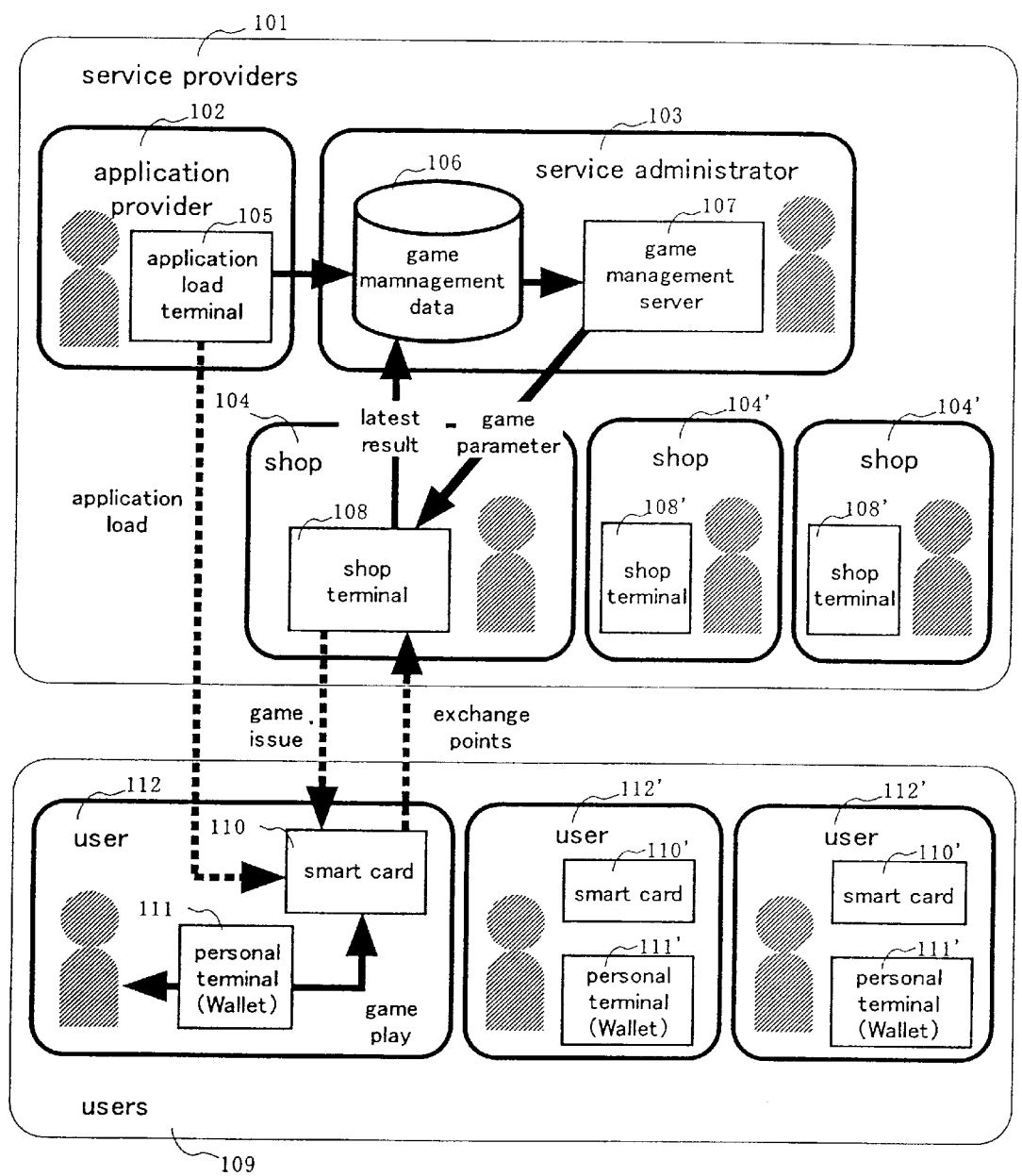
FIG. 1 illustrates a system service image.

FIG. 1 illustrates a service image of a game system using an IC card to be realized by the present invention. The system can roughly be divided to a service provider side (101) for providing services and a user side (109) for receiving services. The service provider side 101 comprises an application provider 102 for providing a game application to the IC card and terminals, a service administrator 103 for administrating game operation and a shop 104 for supplying games to users and exchanging the points. Here, the application provider 102 and the service administrator 103 also have the roles of each other or shares own roles with each other. In an ordinary case, the shop 104 exists in a plurality of areas but the application provider 102 and the service administrator 103 become identical only in one area in some cases. The user side 109 comprises a plurality of users 112 and the respective user 112 has an IC card 110 and the personal terminal 111 (called as "Wallet" having the meaning of an "electronic purse or wallet") for detecting content of such card and executing the process for the card. The application provider 102 first loads the application to the IC card 110 of each user 112. The service administrator 103 receives necessary data from game management data 106 collecting various pieces of information regarding the game system and distributes the game parameters to a shop terminal 108 of each shop 104 using a game management server 107. The shop terminal issues the game pattern enabling execution of a plurality of times determined to the IC card 110 depending on the parameters. The user 112 executes the game using the IC card 110 and the personal terminal 111 and exchanges the points obtained depending on the result with goods at the shop 104. The game issuing condition, user result log, point exchange log data obtained in a series of process are accumulated in the game management data 106 as required and are then fed back to the generation of the next game parameter and game issuance. As explained above, the service provider side can execute management of the situation of the system as a whole when the service administrator dynamically controls the game parameters.

Using FIG. 2 to FIG. 16, FIG. 29, FIG. 40 and FIG. 41, five examples of the game system using the IC card realized by the present invention will be listed and the structure of the IC card and a system structure of each example will be illustrated to explain the processing flow. Here, in the first example, the game pattern is stored in the IC card by loading it from a terminal. In the second example, a game pattern is generated in the IC card. In the third example, the game pattern is not provided and the result is determined by the timing of user input. In the fourth example, the result is determined by the game pattern consisting of questions and answers. In the fifth example, combination is made with the point system as the other application. The fifth example is realized, in some cases, by combination with any one example of the first to fourth examples.

Figure 2:
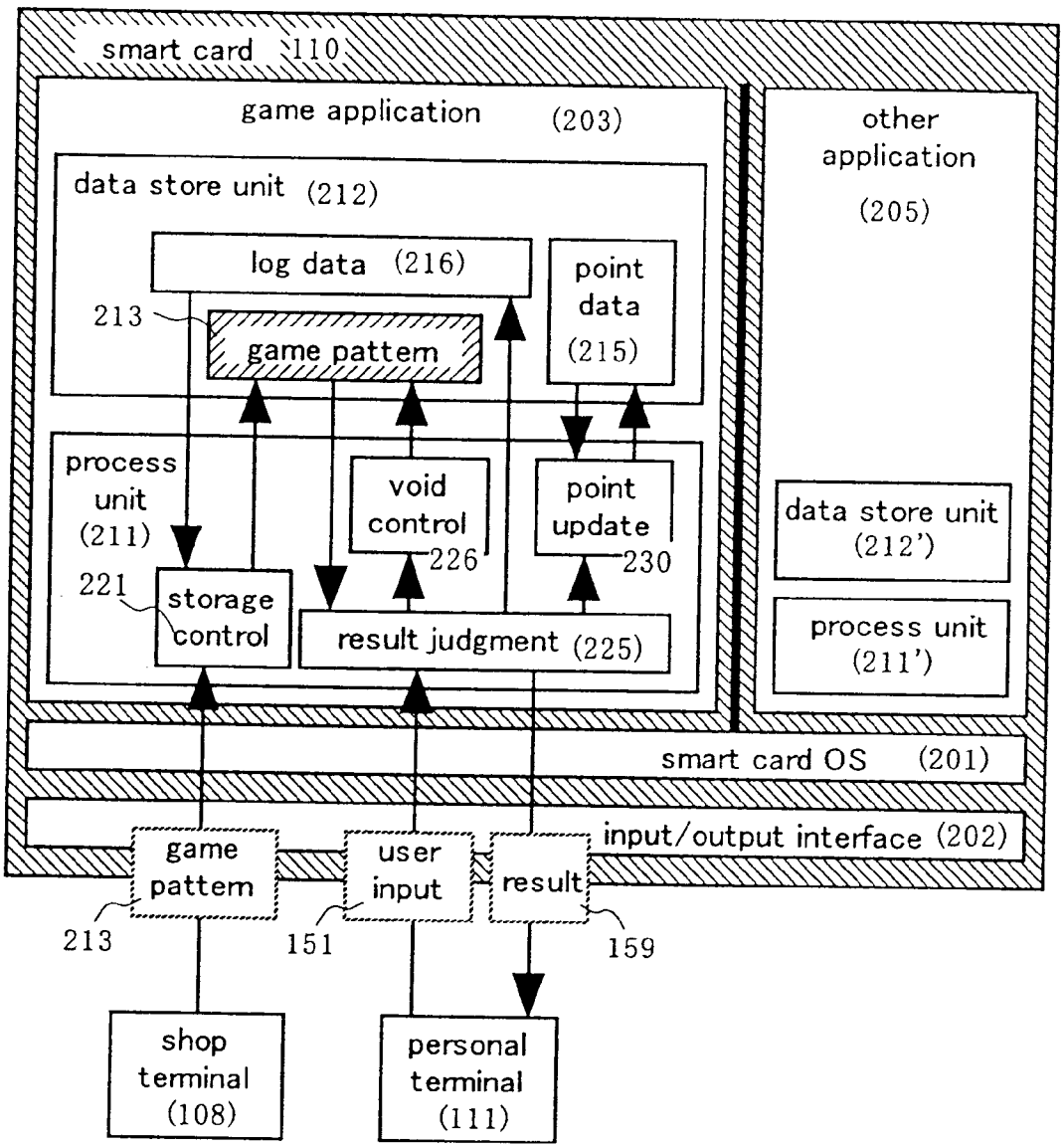
FIG. 2 illustrates a first example of an IC card structure.

FIG. 2 illustrates a structure of the IC card in the first example of the game system using the IC card realized by the present invention. In the IC card 110, a card OS, which safely allows coexistence of a plurality of applications in a sheet of card represented by MUTOS, is loaded on the IC card 110. Through an input/output interface 202, command and data are exchanged with the card dealing terminal. On the OS, a game application 203 and an application 205 of electronic money and the point system are loaded and a certain application is controlled, for the data on the other application, to prevent execution of illegal access to the data on the other application. The game application 203 allows provision of a data store unit 212 for storing data used in the program and a process unit 211 peculiar to the application and the other application 205 allows provision of a data store unit 212' and a process unit 211'. Access to the data stored in the data store unit 212' cannot be made easily from the process unit 211 of the game application 203 and access to the data stored in the data store unit 212 cannot be made easily from the process unit 211' of the other application 205.

To the data store unit 121 of the game application 203, a game pattern 213, log data 216, point data 215 are stored. The game pattern 213 is used for comparison required for determining the result from the user input when a user executes the game and different patterns must be used for each execution of the game. When the ciphered game pattern 213 is transmitted from the shop terminal 108, a data storage control unit 221 deciphers the game pattern 213 transmitted and then compares it with the log data 216 to determine whether the pattern should be stored or not, then converts this pattern to the shape for storing in the card, then stores it as the game pattern 213 in order to wait for execution of the game by user. When a user input 151 is transmitted from the personal terminal 111 when a user plays the game, a result judgment unit 225 searches whether the game pattern 213 is stored or not. When the game pattern is stored, the input 151 from user is compared with the game pattern 213 depending on the predetermined algorithm and the result of a game 159 is returned to the personal terminal 111. In this case, a pattern data void control unit 226 voids the game pattern which is once played so that it is no longer played again. Here, invalidation can be realized, in more practical, by deletion from the data store unit 212 or disabling of re-access by setting the flag for completion of execution. In case the points are added for a user as a result of the game, after a point updating unit 230 checks the value of the point data 215 up to the current point and then it changes the point to a new value. When this point 215 exceeds the predetermined value, it may be exchanged later by goods or amount of money in view of feeding back the result of the game to user. Values are accumulated in the card by repeating the game pattern store process and game playing process explained above.

Figure 3:
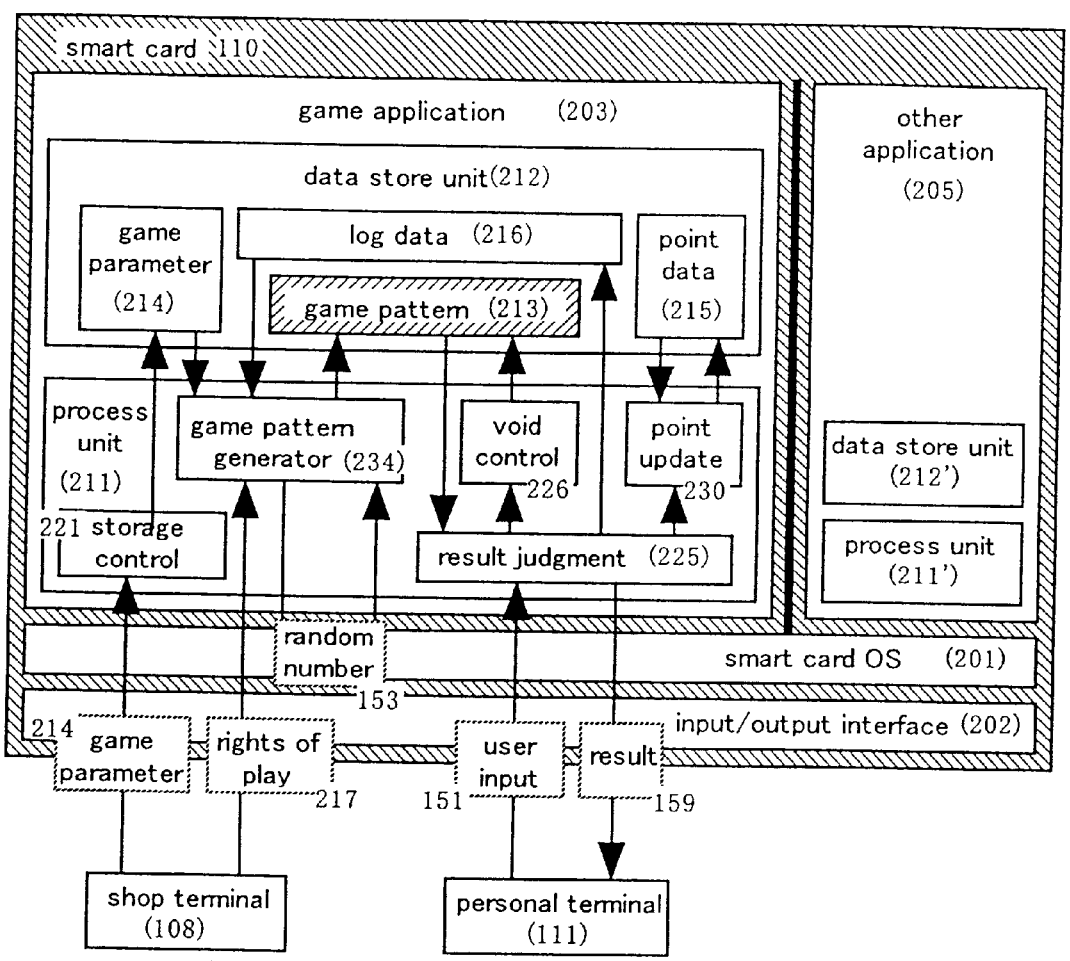
FIG. 3 illustrates a second example of an IC card structure.

FIG. 3 illustrates a structure of the IC card in the second example of the game system utilizing the IC card to be realized by the present invention. Like the first example, the game pattern 213 is stored in the data store unit 212 of the game application 203. Only difference from the first example is that the game pattern 213 is transmitted on the IC card 110 from the shop terminal 108 in the first example, but in the second example, the game pattern 213 is generated on the IC card 110. The game pattern exists only in the card and it does not exist at the outside thereof since game pattern generating process is conducted only in the IC card 110 and thereby system security may be improved. For generation of the game pattern, a game parameter 214 given previously is used. First, when the game parameter 214 is sent from the shop terminal 108, the data store control unit 221 converts such a parameter to the shape to be stored in the card and then stores the game parameter 214 in the data store unit 212. In the game issuance process from the shop terminal 108, the data defining the number of times of play of the game to be played by user called as the right of playing game 217 is transmitted to the card. Upon reception of right of playing game 217, a game pattern generator 234 in the card generates the game pattern using the previously stored game parameter 214 and log data 216 depending on the number of times of play. The generated game pattern 213 is stored in the data store unit 212. The game playing process is similar to that of the first example. When the user input 151 is transmitted from the personal terminal 111, the result judgment unit 225 compares the user input 151 with the previously stored game pattern 213 depending on the predetermined algorithm and then returns the result of the game 159 to the user terminal 110. Result of the game is reflected on the point data 215 by the point updating unit 230 and simultaneously the pattern data void control unit 226 performs the process to void the executed game pattern.

Figure 4:
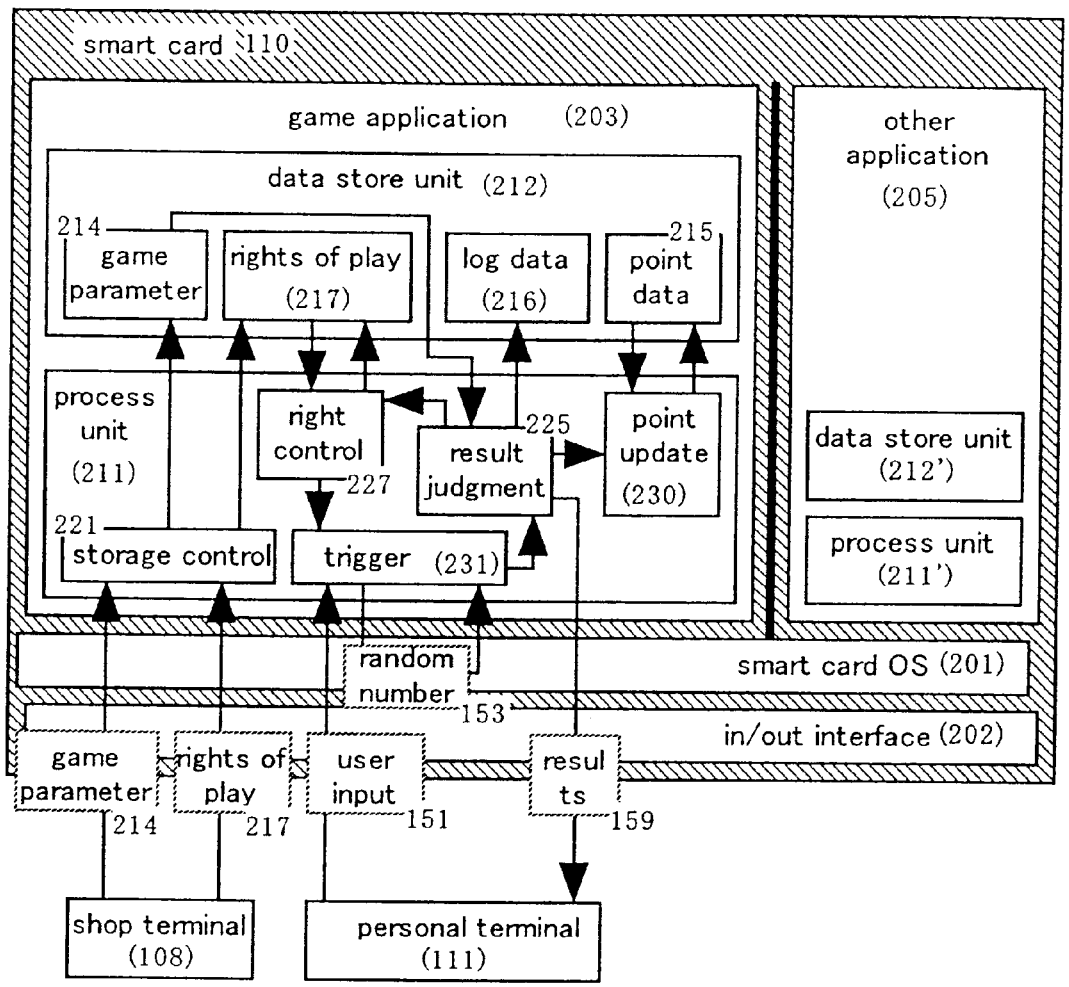
FIG. 4 illustrates a third example of an IC card structure.

FIG. 4 illustrates a structure of the IC card of the third example of the game system utilizing the IC card realized by the present invention. In this example, the game pattern used in the first and second examples is not required and it is determined by the timing of user input. In this example, since the game pattern itself does not exist, there is no fear for possibility of stealing glance of pattern by a malicious user and thereby system security is very high. For the determination of the game result, user input and game parameter 214 given previously are used. First, when the game parameter 214 is transmitted from the shop terminal 108, the data store control unit 221 converts the parameter to the format which may be stored in the card and then stores this parameter as the game parameter 214 in the data store unit 212. In the game issuing process from the shop terminal 108, like the second example, the right of playing game 217 is sent to the card. Upon reception of the right of playing game 217, the store control unit 221 converts it to the format which can be stored in the card and then stores it to the data store unit 212 as the data for right of playing game 217. During execution of the game, control unit for a game playing right 227 checks whether the remaining right is set to the right of playing game 217 or not. When right is still left, a game play trigger 231 operates depending on the user input 151 from the personal terminal 111 and game play result can be obtained by the result judgment unit 225 depending on a clock value 153 (or it may be a random number for obtaining a value different by the timing) in the card and the predetermined algorithm of the game parameter 214. Like the first example and second example, game playing result is reflected on the point data 215 by the point updating unit 230. Moreover, when play is over, the right of playing game 217 is reduced by the control unit for rights of playing game 227.

Figure 5:
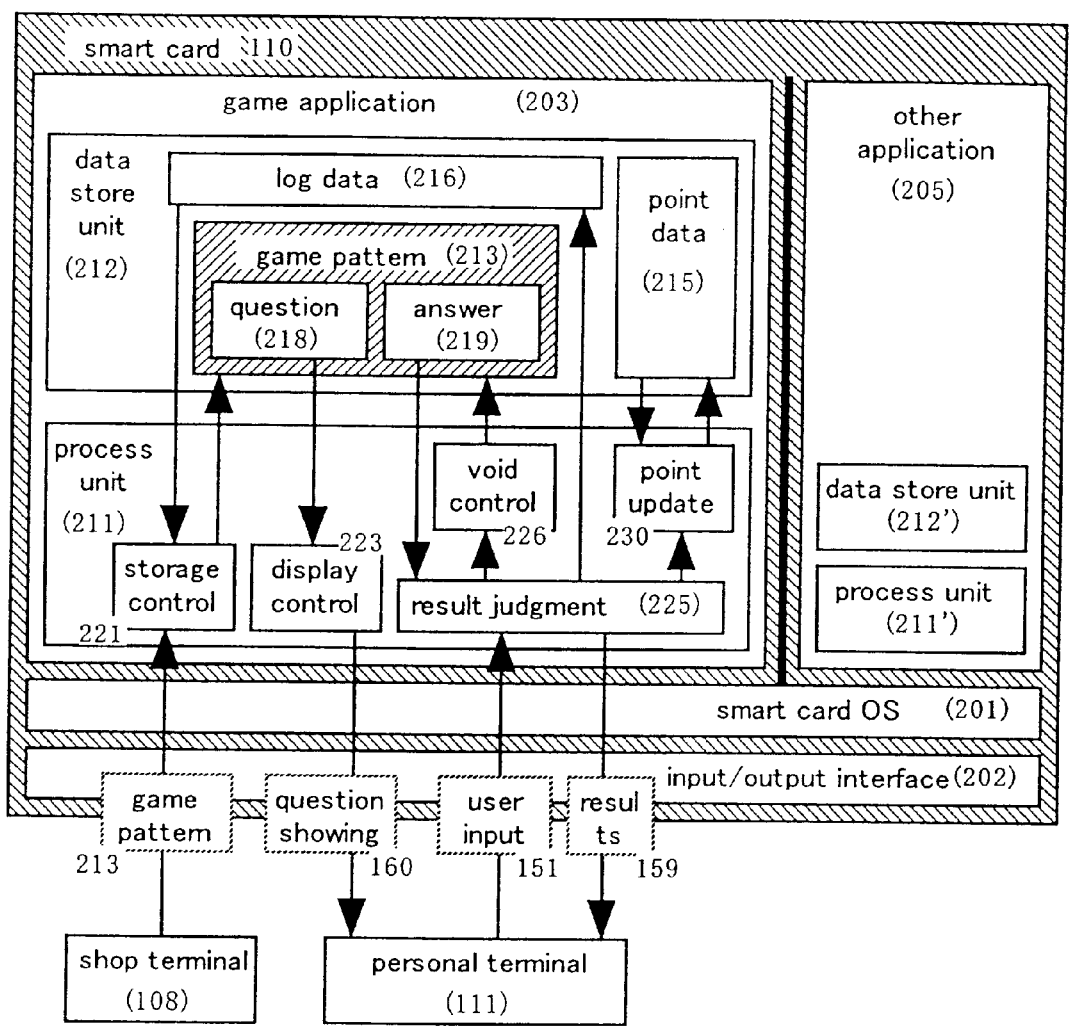
FIG. 5 illustrates a fourth example of an IC card structure.

FIG. 5 illustrates a structure of the IC card in the fourth example of the game system using the IC card realized by the present invention. In this example, the game pattern 213 in the first example is formed as a pair of question data 218 and answer data 219. Loading of the game pattern and playing of the game are almost equal to that of the first example. Namely, the question data 218 is presented to a user (160) from the personal terminal 111 and the process unit 211 compares the user input 151 and the answer data 219 to obtain the result of the game.

Figure 6:
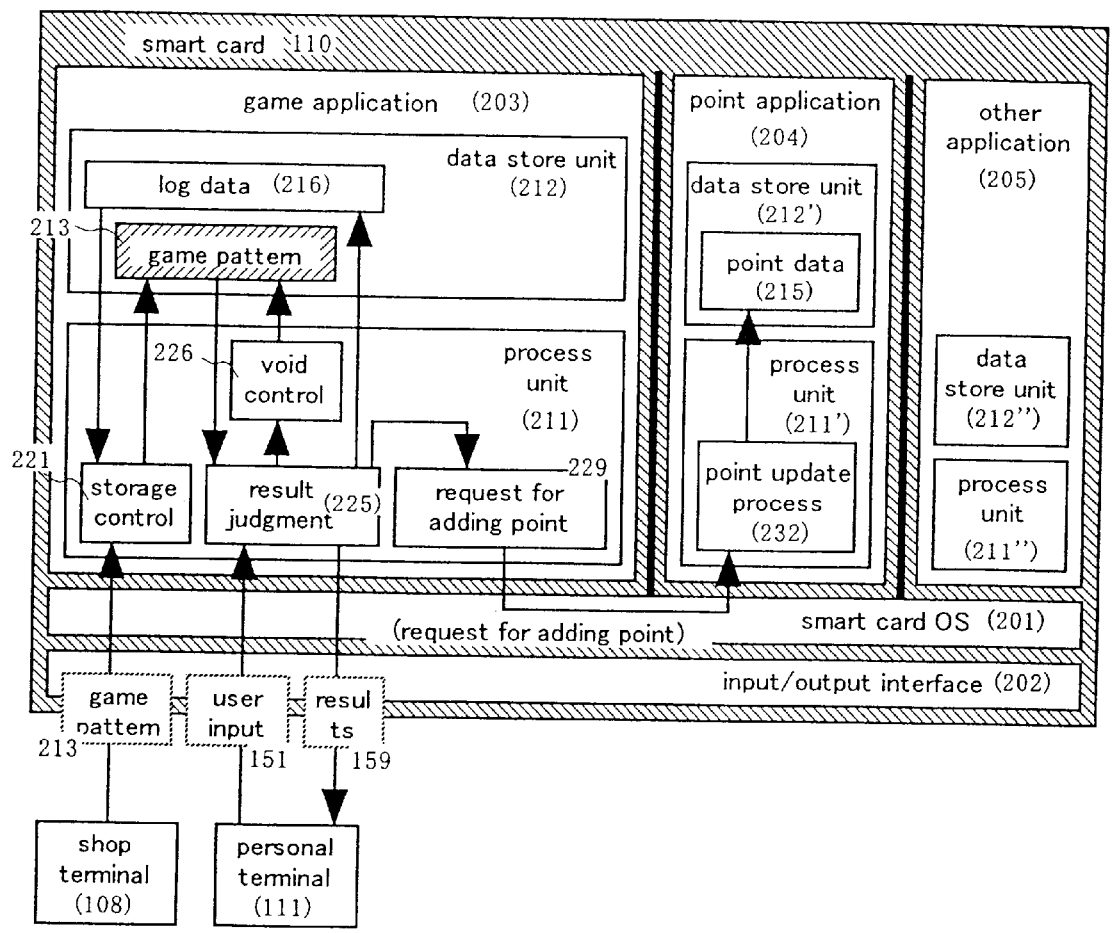
FIG. 6 illustrates a fifth example of an IC card structure.

FIG. 6 illustrates a structure of the IC card in the fifth example of the game system using the IC card realized by the present invention. In this example, the point for reflecting the game result is independent as the other application called a point application 204. The point application 204 includes the data store unit 212' and the process unit 211' and the point data 215 is stored in the data store unit 212'. The process unit 211' includes a point addition unit 232 to conduct management of values of the point data 215. As is explained previously, from the viewpoint of security, free access to the data store unit 212' of the point application from the game application 203 is impossible. Therefore, when it is requested to add the point data on game result, the request for an adding points unit 229 requests the point adding process to the point application 204. The process request is sent to the point application 204 via a card OS 201 and the point application 204 executes the value adding process to the point data 215 based on such process request. Process request to the other application is called delegation and this function is loaded to the latest MULTOS. As an application of this example, it is considered that the game result is reflected on the electronic money application in place of the point application and feedback to user obtained as the game result is replaced in direct with the value as the money.

Explained above is the structure of the IC card in the example of the game system using the IC card realized by the present invention.

Structure and process flow of the game system using the IC card explained above will then be explained with reference to FIG. 7 to FIG. 16.

Figure 7:
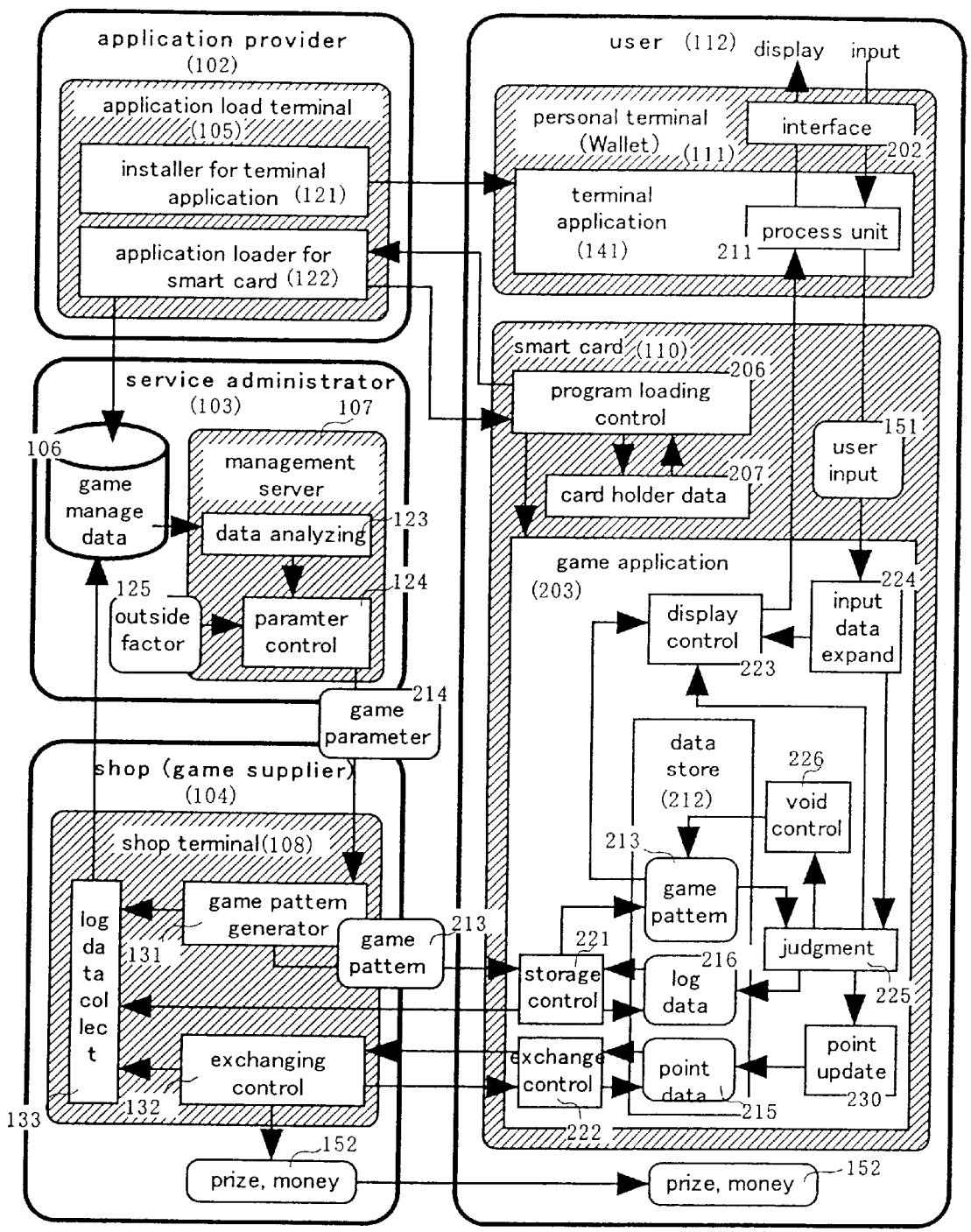
FIG. 7 illustrates a system structure and a first example of a processing flow.
Figure 8:
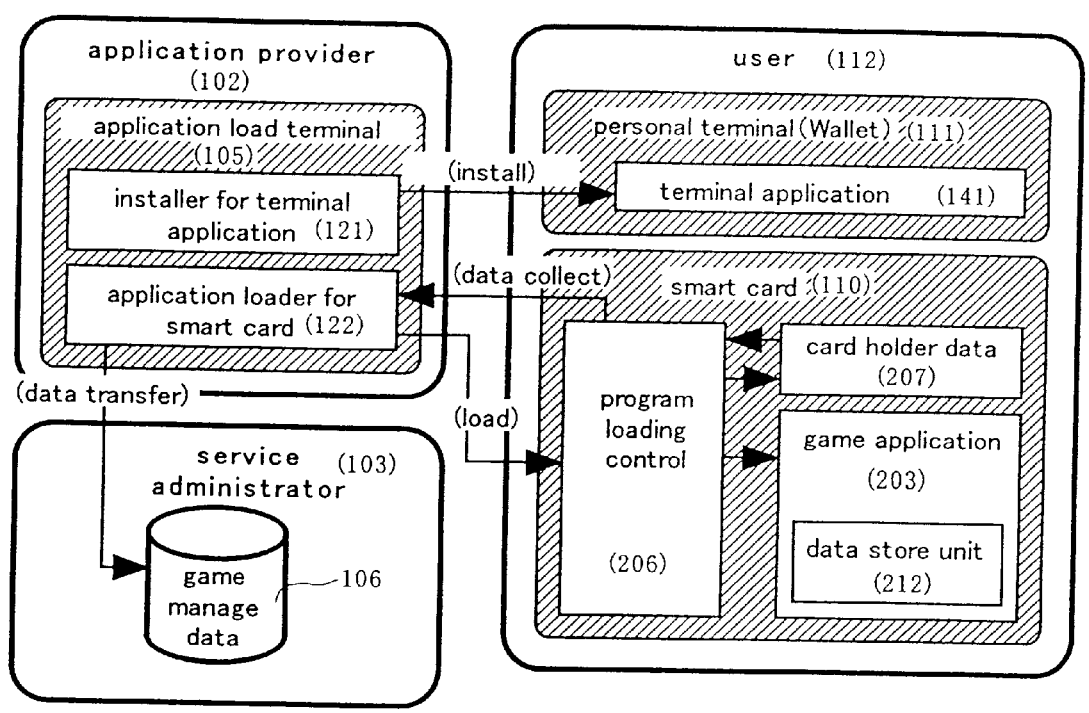
FIG. 8 illustrates a system structure and an application issuing process in a first example of a processing flow.
Figure 9:
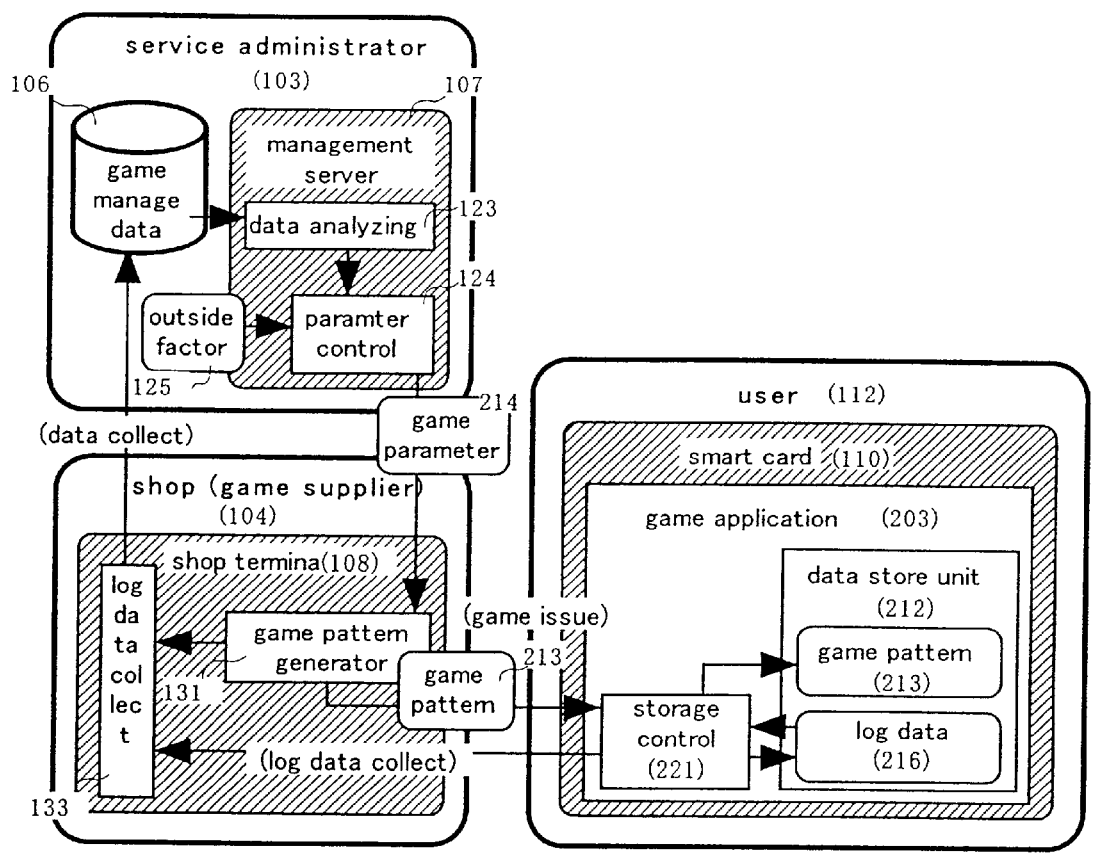
FIG. 9 illustrates a system structure and a game issuing process in a first example of a processing flow.
Figure 10:
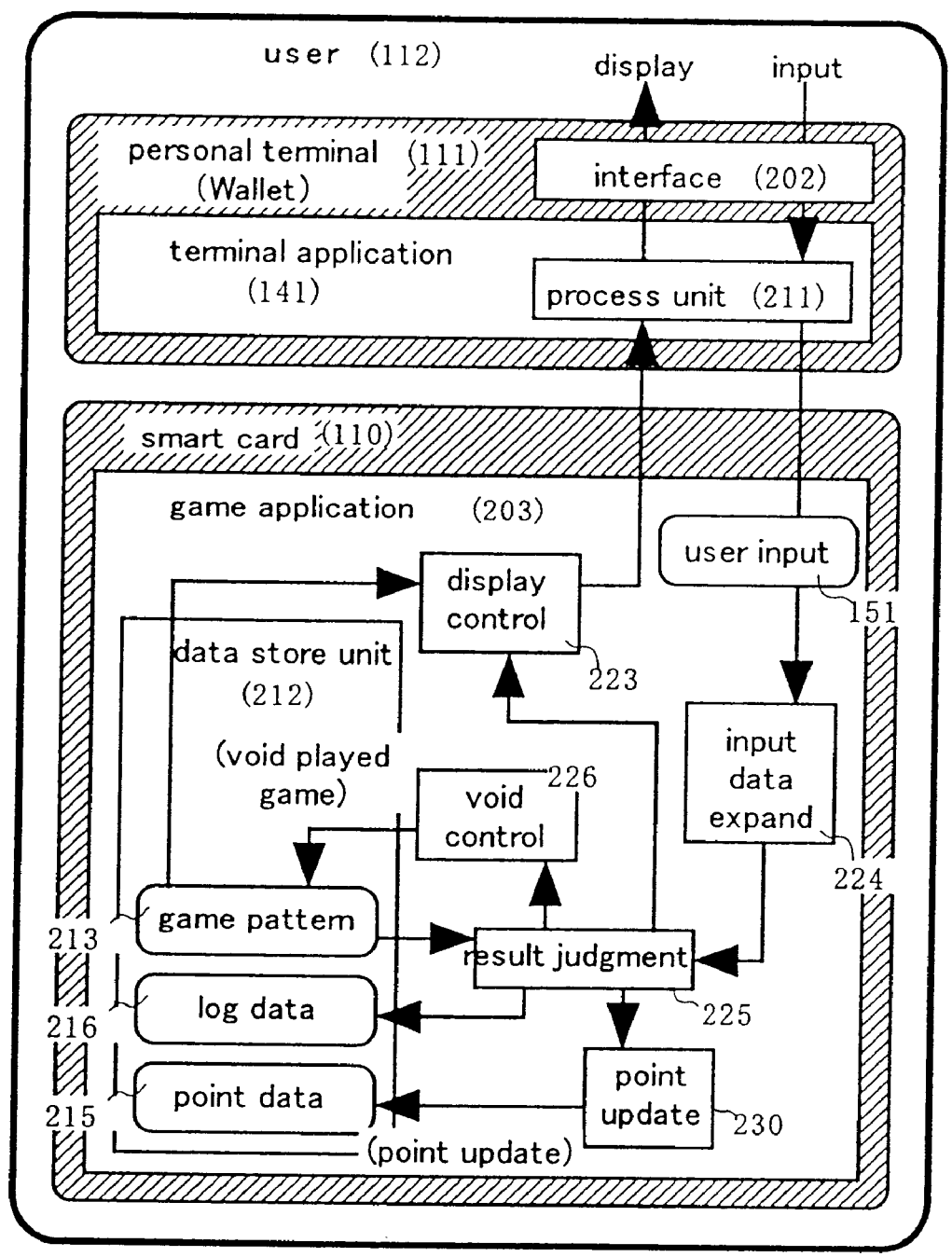
FIG. 10 illustrates a system structure and a game execution process in a first example of a processing flow.
Figure 11:
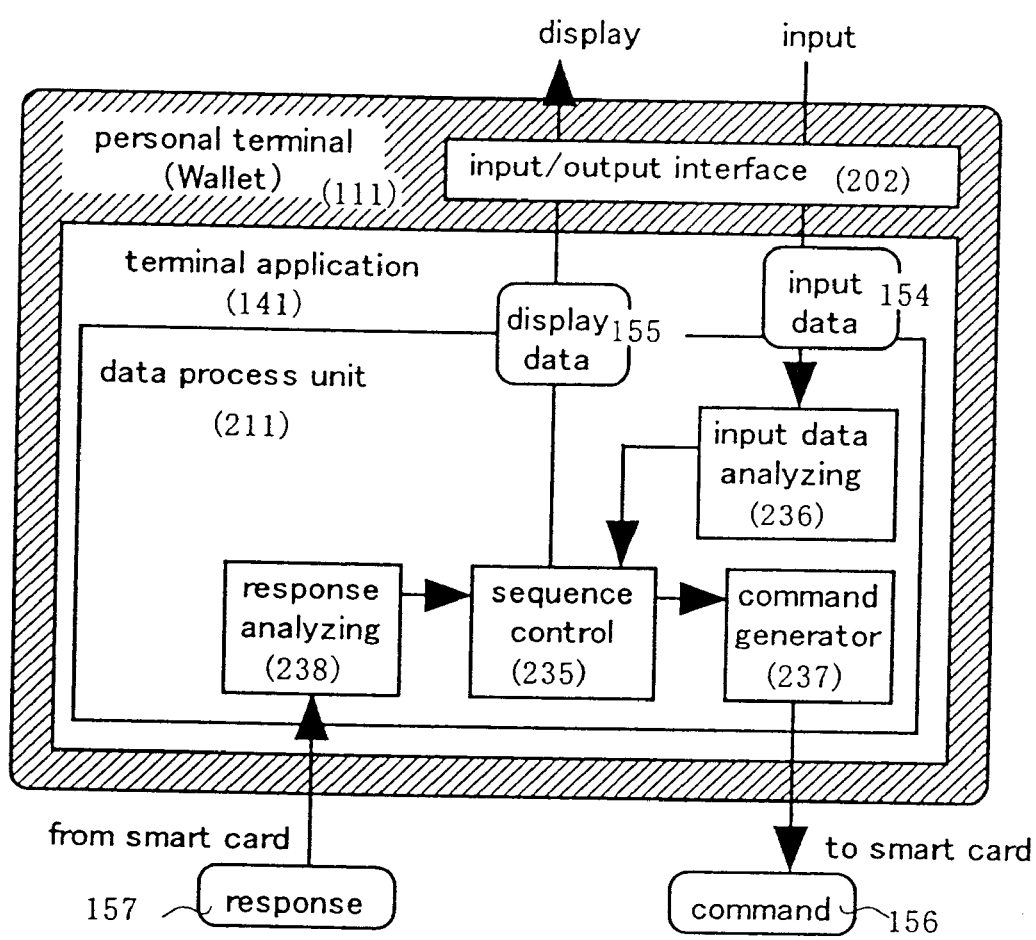
FIG. 11 illustrates a system structure and a structure of a personal terminal in a first example of a processing flow.
Figure 12:
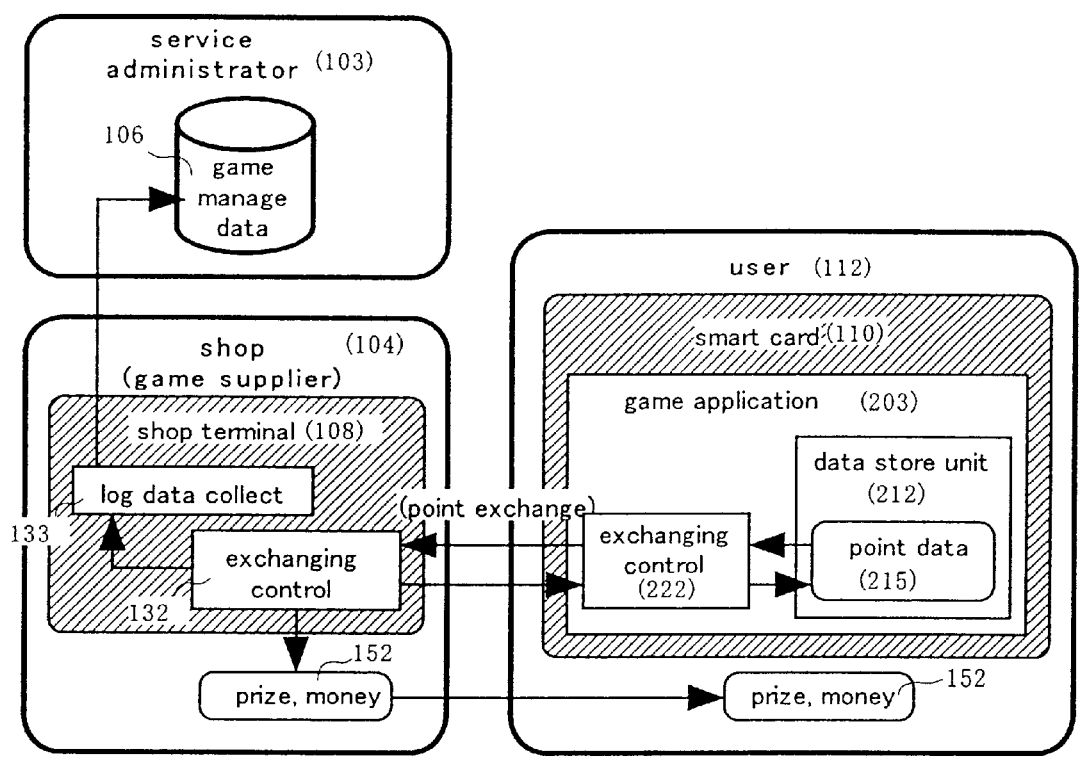
FIG. 12 illustrates a system structure and a point exchange process in a first example of a processing flow.

FIG. 7 illustrates a system structure and process flow thereof as the first example of the game system using the IC card realized by the present invention. The system process is divided to the four steps of (1) an application issuing process, (2) game issuing process, (3) game playing process and (4) point exchange process. In FIG. 8, FIG. 9, FIG. 10 and FIG. 12, the system structure of FIG. 2 is disassembled to above four steps and only the necessary structural elements are extracted. FIG. 8 illustrates the application issuing process, FIG. 9 illustrates gate issuing process, FIG. 10 illustrates game playing process and FIG. 12 illustrates point exchange process, respectively. Moreover, FIG. 11 illustrates a structure of the personal terminal side in the game issuing process.

Process flow in each step in the system realized by the present invention will be explained with reference to FIG. 8 to FIG. 12.

An Application Issuing Process (FIG. 8)

The application provider 102 loads the application to the personal terminal 111 of the user 112 and the IC card 110 via an application terminal 105. Since the user 112 is requested, to play the game, to have the program on the IC card 110 and program on the personal terminal 111. Therefore, both programs must be loaded. A terminal application installer 121 loaded on the application load terminal 105 loads a terminal application 141 to the personal terminal 111, while a card application loader 122 loads the game application 203 to the IC card 110. Here, an application program load control unit 206 of the card IC card 110 administrates the loading of the game application 203 to the card and also transmits the information about card and user stored in the card to the application load terminal 105. The card application loader 122 extracts card user information 207 and transmits the information about the card (identified by the card ID given to each card) to which the game application is loaded, users (age, interests, etc.) having or not having this game to the game management data 106 belonging to the service administrator 103.

A Game Issuing Process (FIG. 9)

When the user 112 requests playing of the game, he/she must requests issuing of the game to the IC card 110 via the shop terminal (game provider terminal) 108 existing in the shop (game provider) 104 after loading of the application. Each game is loaded to the IC card 110 from the shop terminal 108 in the form of the game pattern 213 stored in the area of the application data store unit 212 in the game 203 loaded previously. Loading of the game pattern is conducted as the service offered depending on the amount of shopping or each purchasing of right of playing game. When the game pattern 213 is issued, the game parameter 214 such as winning probabilities of the game and amount of the prize of the game is dynamically controlled by the game administrator server 107. The game parameter 214 is generated, based on the game management data 106 belonging to the service administrator 103, by a parameter control unit 124 considering result of analysis by a data analyzing unit 123 in the game administrator server 107 and a outside factor 125 determined by the service administrator depending on the season and date. In more practical, the outside factor 125 includes, for example, adjustment for setting higher the winning probabilities during the sales campaign or raising up the amount of the prize, etc. This game parameter 214 is sent to the shop terminal 108 of the shop 104 and thereby the game pattern 213 is generated by a game pattern generating unit 131. Here, since the log data for game pattern issuance of each user being sent from the IC card 110 is considered in the process to generate the game parameter 214, it is prevented that the same game pattern as the preceding games played by users 112 is loaded for a plurality of times. The game pattern 213 generated is ciphered to prevent stealing glance during transmission and is then transmitted to the IC card 110. The data store control unit 221 having received the game pattern 213 deciphers first the transmitted ciphered game pattern, compares the game log data 216 stored in the card with the received game pattern 213, accepts it when it is adequate game pattern, converts it to the format to be stored in the card and then stores it as the game pattern 213 on the card. In this case, the stored game pattern is accumulated in the log data 216 and simultaneously the log data 216 up to the preceding game result is stored in the log data collecting unit 133 of the shop terminal 108 and is then fed back to the game management data 106.

A Game Playing Process (FIG. 10)

The game playing process by user 103 may be conducted only in the IC card 110 and the personal terminal 111 at the area isolated from the service provider side. It is a merit of the system utilizing the IC card that a user can play the game any time he/she wants even when the user is not always connected to the service provider side. The game pattern 213 which is previously stored in the application data store unit 212 is converted to the format presented to the user by a data display control unit 223 and is then transmitted to the personal terminal 111. In the personal terminal 111, the received display data is processed by the process unit 211, displayed on the screen by the input/output interface 202 of terminal and is then presented to the user 112. The user 112 inputs the data based on such display. An input from user is sent to the IC card 110 through the input/output interface 202 and the process unit 211. Within the IC card 110, this user input 151 is developed by an input data expanding unit 224. Here, when the game pattern 213 is already stored, the expanded input data and the game pattern 213 are compared depending on the predetermined algorithm in the result judgment unit 225. Judgment result is sent to the data display control unit 223 and is then presented to user via the personal terminal 111. Moreover, when the result is a true answer, the point updating unit 230 adds the points assigned to this game to the accumulated point 215. This point data 215 has the value which may be exchanged, when it reaches the particular points, by the prize or money. The game playing result and accumulated points are stored in the log data 216. Moreover, in this case, the pattern data void control unit 226 voids the game pattern which is once played so that the game pattern which is once played is never played again. Voiding may be realized in general by deleting the game pattern from the data store unit or by setting the flag. Thereby the control is performed so that reference is never made to the data which is once referred at the time of playing the game after the next play of the game.

FIG. 11 illustrates a structure (illustrated as "a process unit (211)" in FIG. 10) of the terminal application 141 on the personal terminal 111 in the game playing process. In more practical, the process unit 211 comprises a game play sequence control unit 235, an input data analyzing unit 236, a command generator 237 and a response data receiver. The game play sequence control unit 235 controls the function to control flow of the game play to urge a user to input data and the function to request the result to the IC card. The input data analyzing unit 236 analyzes an input from the user having received from the input/output interface 202. The command generator 237 and response data analyzing unit 236 control generation and analysis of the command/response for the IC card. The processes to be conducted by the structural elements of the process unit 211 will be explained, considering, as an example, the game (for example, a scratch game explained later) in which result of the game is judged for input of a plurality of times by user. Upon reception of instruction to play the game, the game play sequence control unit 235 sets display data 155 on the terminal for playing the game to present initial display to user via the input/output interface 202 of terminal. When a user tries the first input responding to the display, the input data analyzing unit 236 analyzes input data 154 and then sends it to the game play sequence control unit 235. The game play sequence control unit judges that it is the first input by user and then transfers this input to the command generator 237 by adding the adequate parameter.

The command generator 237 generates a command 156 for the IC card setting the input data 154 as the parameter and then sends the command to the IC card 110. Meanwhile, process is conducted in the card. When a response 157 is returned, a response analyzing unit 238 processes the response and then transfers data to the game play sequence control unit 235. The game play sequence control unit 235 detects that this is the response from the card for the first user input and therefore sets the display data 155 to present, to user, the display of the parameters returned in association with the response on the terminal as the intermediate process and then presents the intermediate process display to user through the input/output interface 202 of terminal. These processes are repeated until the final result of the game is returned from the IC card and the final result of the game is displayed to complete the first play of the game.

(4) A Point Exchange Process (FIG. 12)

When point data by playing of games are accumulated, the user 112 brings the IC card 110 to his desired shop 104 to conduct the point exchange process. The IC card 110 is inserted to the shop terminal 108 to request the exchange. When the points have reached the predetermined value, this point can be exchanged by a predetermined prize or money 152. In this case, the point exchange control unit 222 of the IC card 110 sends the point value to the shop terminal 108. A point exchange process unit 132 of the shop terminal 108 checks the point value and performs point reduction process, etc. on the IC card 110. Simultaneously, log data on the point exchange is stored in a log data collecting unit 133 on the shop terminal 108 and is then transmitted to the game management data 106 on the real-time basis or with the predetermined interval. The prize or the amount of the money 152 is transferred to the user 112 from the shop 104.

Figure 13:
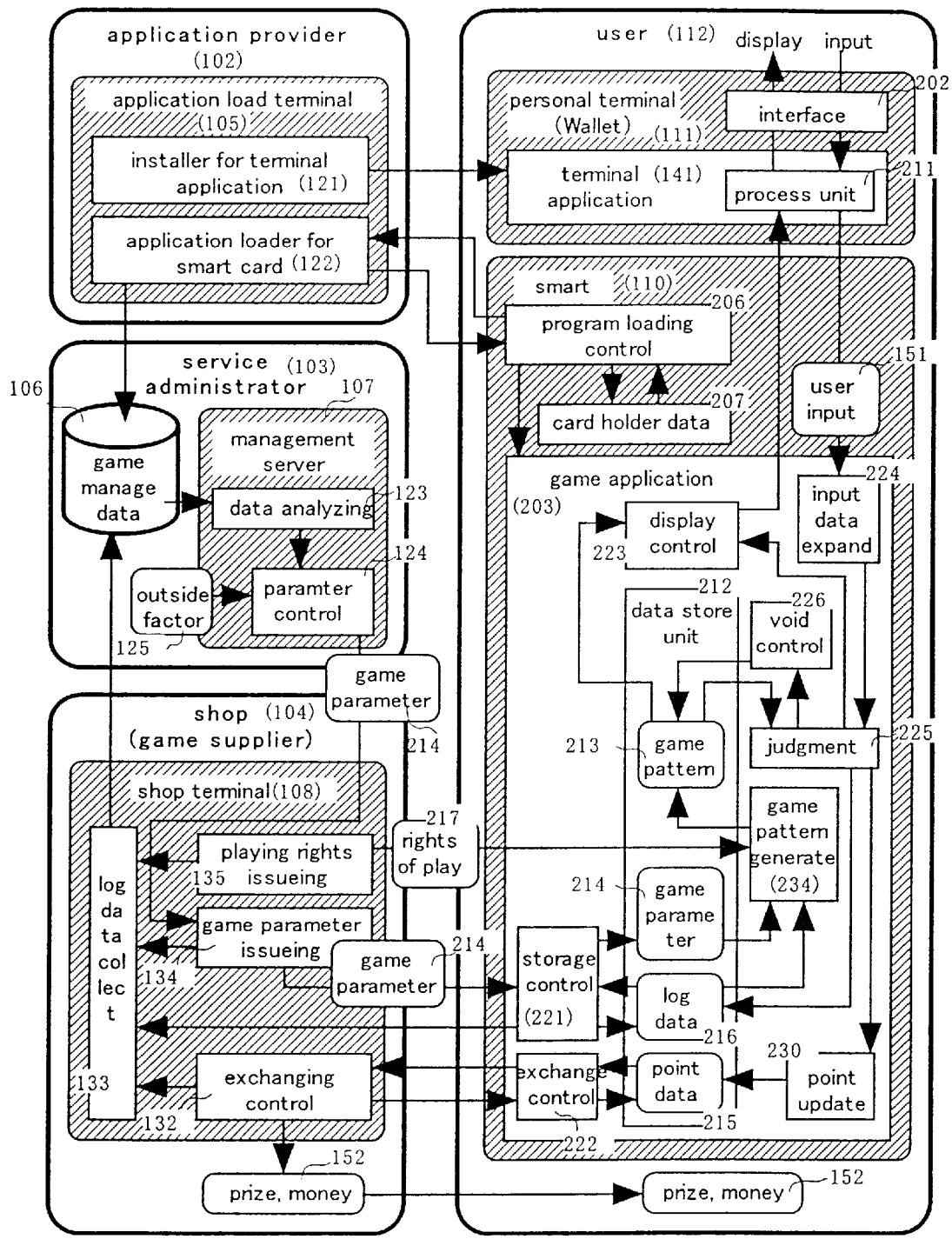
FIG. 13 illustrates a system structure and a second example of a processing flow.

FIG. 13 illustrates a system structure of the second example of the game system using the IC card realized by the present invention and process flow thereof. FIG. 13 illustrates a system formed by using the IC card having the structure illustrated in FIG. 3. As is explained in FIG. 3, in this example, the game pattern is generated on the IC card of the user side, in place of the service provider side.

As the preparation of the game issuance, it is assumed that the shop terminal has transmitted the game parameter 214 required for generation of the game pattern to the IC card 110. Issuance of this game parameter may be made in the predetermined frequency or as required or each time when the right of playing game is issued. When the game parameter 214 is sent, the data store control unit 221 of the IC card 110 stores the parameter to the data store unit 216. Each game issuance process to user is executed in the form of issuance of right of playing games. As the service corresponding to the shopping, or each purchasing of right of playing game, the right of playing game 217 is transmitted to the IC card 110 from the shop terminal 108. When the IC card 110 receives the right of playing games, the game pattern generator 234 operates to generate the game pattern 213 using the game parameter 214 stored previously (or transmitted simultaneously with the right of playing game) and the log data 216. Generation of the game is generally performed in the card by issuance of random numbers. Since the game is generated in the card, possibility for existence of the game pattern in the outside of card can be eliminated and simultaneously game pattern data is never communicated between the terminal 108 and the IC card 110. Thereby, stealing glance by the third party is now impossible and accordingly system security can be raised. In regard to playing of the game and point exchange process, processes are conducted in the same manner as the first example. The game pattern which is once played is surely voided in the same manner.

Figure 14:
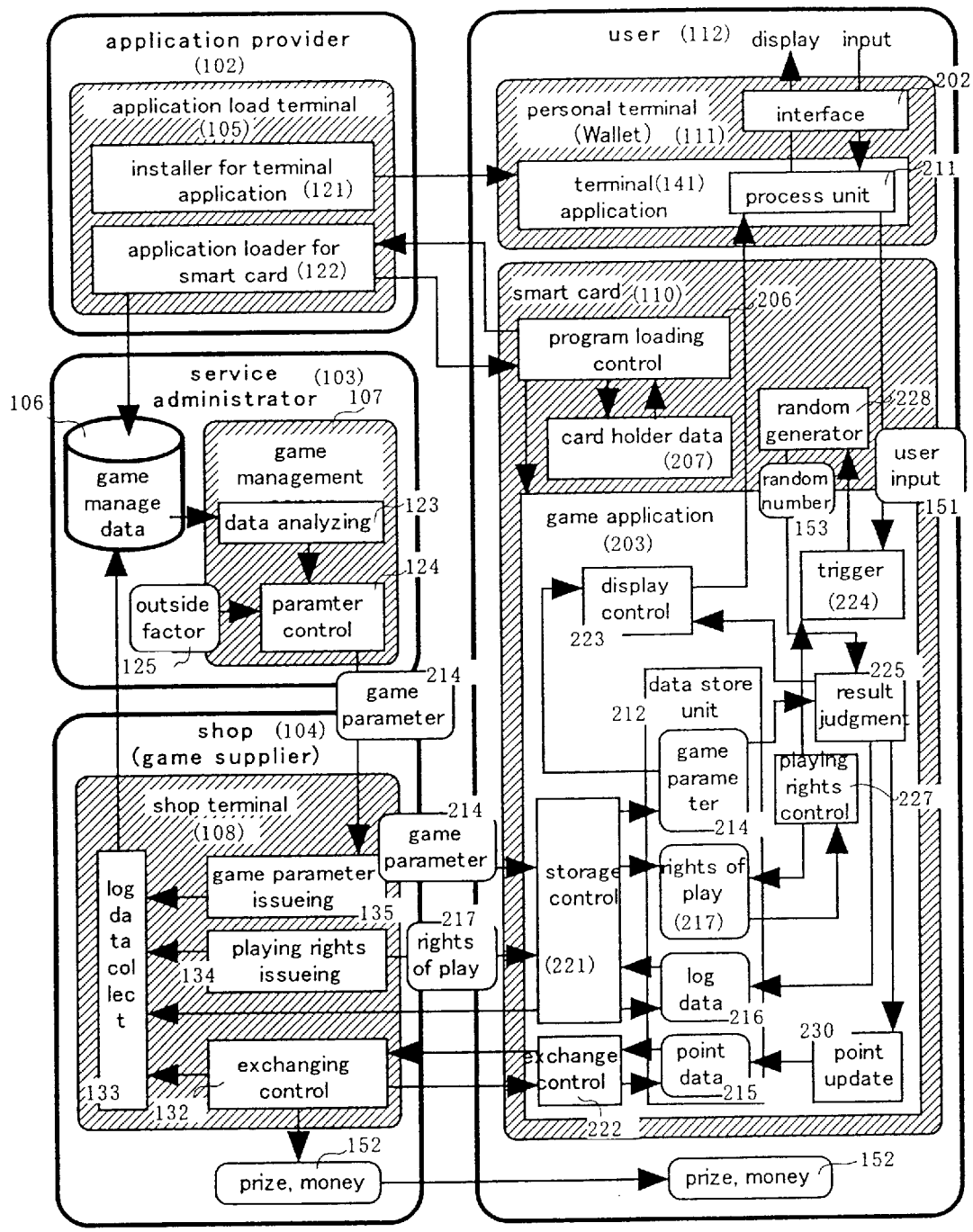
FIG. 14 illustrates a system structure and a third example of a processing flow.

FIG. 14 illustrates a system structure of the third example of the game system using the IC card realized by the present invention and process flow thereof. FIG. 14 illustrates the system formed by using the IC card in the structure illustrated in FIG. 4. As is explained with reference to FIG. 4, in this example, the IC card 110 does not have the game pattern and result of the game is judged by the timing of user input. In more practical, result of the game is generated, depending on the predetermined algorithm, using the values from the random number generator which can obtain different values from the internal clock generated in the IC card 110 and generation timing. Like the second example, as the preparation for issuance of the game, the shop terminal transmits the game parameter 214 required for generation of the game pattern to the IC card 110 and the data store control unit 221 stores such a parameter in the data store unit 212. In the game issuing process, like the example 2, the right of playing game 217 is transmitted to the IC card 110 from the shop terminal 108. When the right of playing game 217 stored previously has allowance, the data store control unit 221 conducts the process to increase the number of times of right of playing games. During the play of the game, when the right of playing game has the right of the user to play the game, the game parameter 214 is converted in the display control unit 223 and it is presented to a user from the personal terminal 111. When a user input 151 is appearing via the personal terminal 111, it is used as the execution trigger 231 to try to acquire the data to an internal clock 228 in order to receive the clock value 153. This clock value may be a random number having different values depending on the timing. Result of the game is judged by the result judgment unit 225 by the predetermined algorithm through combination of the clock value 153 and the game parameter 214. Depending on this result, the point data 215 is added and simultaneously log data 216 is updated. The control unit for rights of playing game 227 executes the process to reduce the right of playing game 217. The right of playing game 217 can generally be set for a plurality of times and a user can play the games until the right of playing game becomes zero. Exchange process for point data 215 with goods can be realized in the same manner as the first and second examples. In this example, since the result is obtained depending on the user input timing, possibility element is increased and since the game pattern does not exist in the shop terminal 108 and in the IC card 110, there is no fear for stealing glance of the game pattern and system security can be maintained higher.

Figure 15:
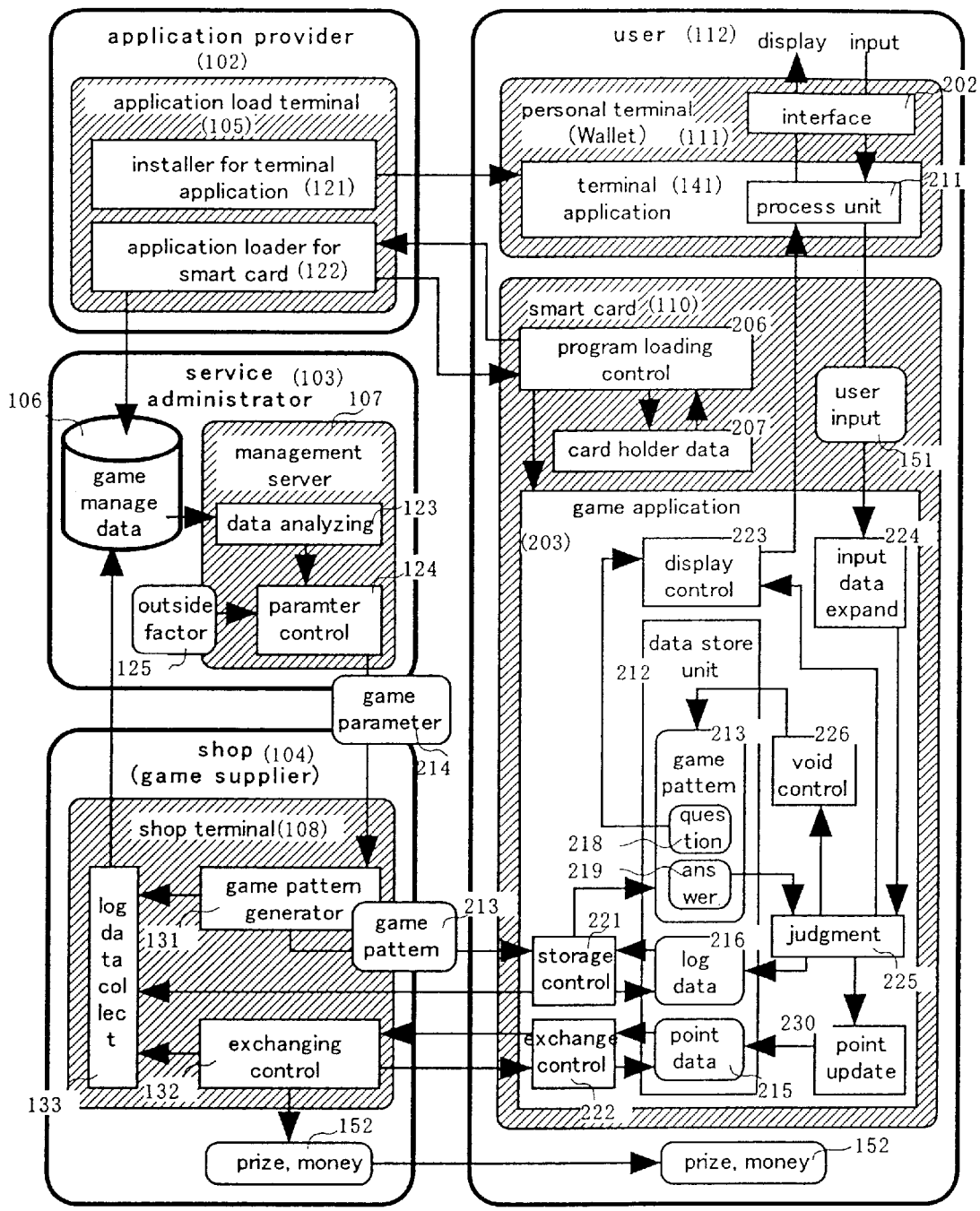
FIG. 15 illustrates a system structure and a fourth example of a processing flow.

FIG. 15 illustrates a system structure of the fourth example of the game system using the IC card realized by the present invention and the process flow thereof. FIG. 15 illustrates a system structured by the IC card formed as illustrated in FIG. 5. As is explained with reference to FIG. 5, this example has the data consisting of a pair of question data 218 and the answer data 219 as the game pattern 213 in the IC card 110. Issuance of the game pattern is executed in the same manner as the first example, the game pattern 213 is disassembled to the question data 218 and the answer data 219 on the occasion of playing the game, the question data 218 is presented to the personal terminal 111 of the user and result is judged by comparing the user input 151 and answer data 219. Sequence of the game issuing process, game playing process, game pattern voiding process and point exchange process is almost identical to those of first example. It is also thought, as an application of this example, that the question data itself is previously stored in the personal terminal 111, the question ID and answer data are distributed as the game pattern 213 and the game is played through incorporation with the IC card 110 and personal terminal 111. But, these are not explained in detail.

Figure 16:
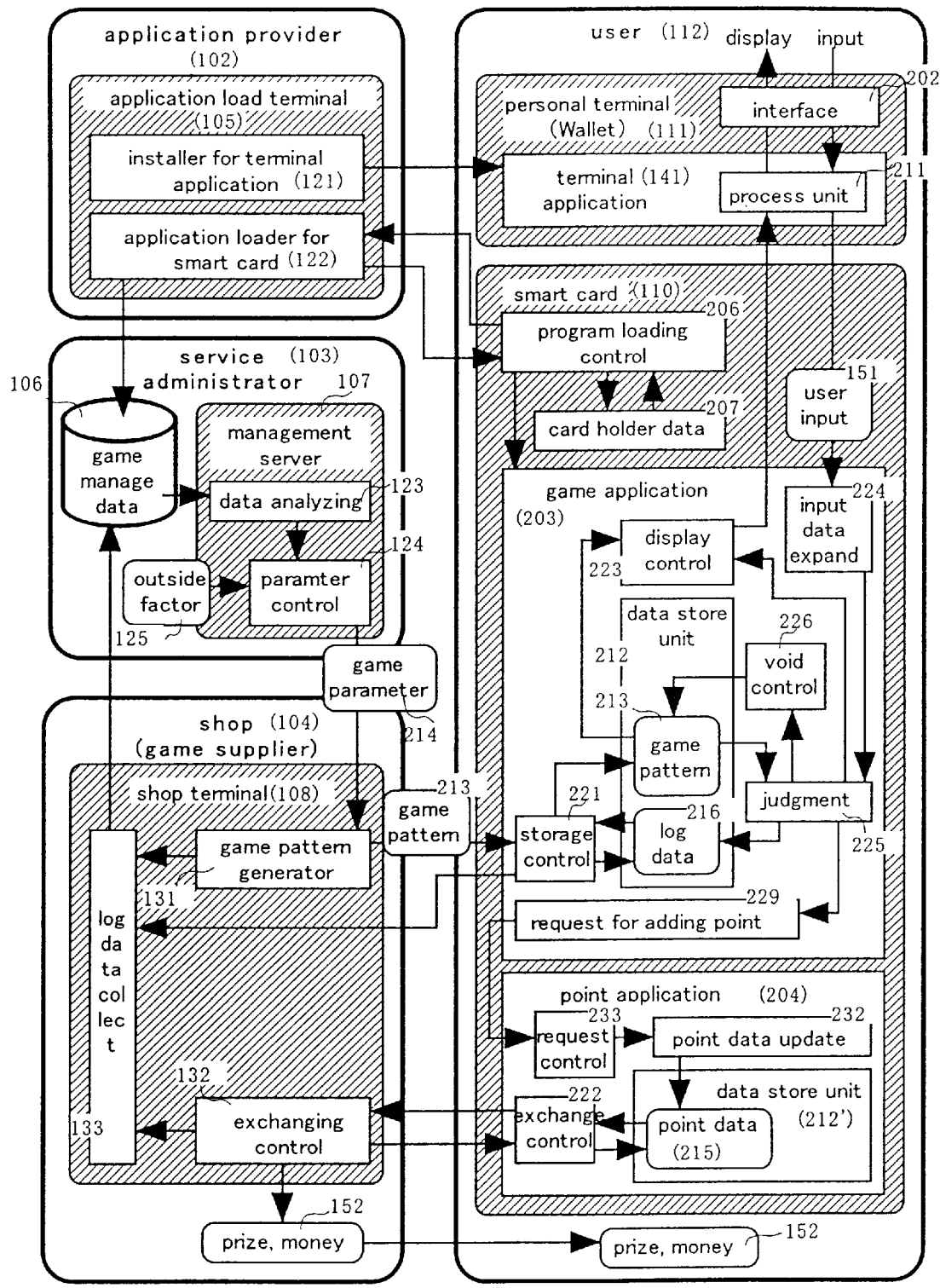
FIG. 16 illustrates a system structure and a fifth example of a processing flow.

FIG. 16 illustrates a system structure of the fifth example of the game system using the IC card realized by the present invention and the process flow thereof. FIG. 16 illustrates a system formed by using the IC card having the structure of FIG. 6. As is explained in FIG. 6, in this example, any example of the first to fourth examples is applied for issuance of the game and playing of the game, but management of point obtained as a result of the game is performed by the other application. In the IC card 110, the point system application program 204 provided additionally also exists in addition to the game application 203 and therefore the point obtained as a result of execution of the game application 203 is administrated in the point system application 204. In the example of FIG. 16, the same elements as that of the first example are used for issuance of the game and playing of the game. On the occasion of judging the result of the game by the result judgment unit 225 and adding the points, the request for the adding points unit 229 operates to issue the value adding request to the point application 204. As illustrated in FIG. 6, a certain application is controlled not to make free access to the data on the other application in the IC card OS corresponding to a plurality of applications, the value addition to the point is conducted in the form of delegation. In more practical, the value addition request is sent to the outside of the game application 203 passing the request for the adding points unit 229 and is then transmitted to the point application 204 via the card OS. A request process unit 233 of the point application 204 receives the process request and then transfers it to the point addition unit 232. The point addition unit 232 processes this process request in the same manner as the command transmitted from the outside terminal and adds the point value given as the parameter to the accumulated point data 215. According to the fifth example, result of the game application can be fetched to the pre-loaded existing point system, and since the point management is shared to the point system, characteristic of the IC card corresponding to a plurality of applications may be fully utilized. In this example explained above, management of the monetary value obtained as a result of the game can be shared to the point system, but it is also possible to realize management of the monetary value by utilizing the electronic money system without via the point system.

Figure 20:
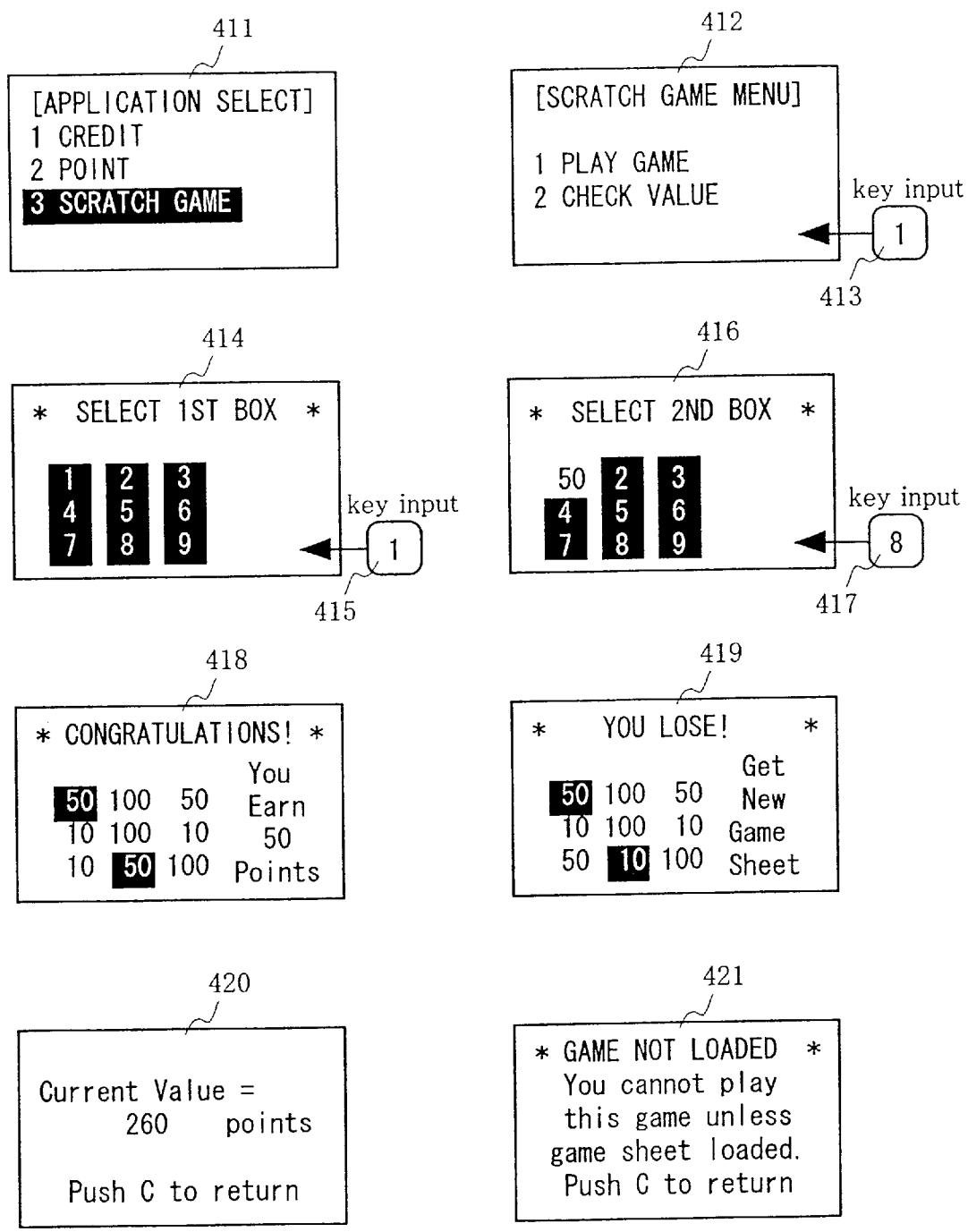
FIG. 20 illustrates a flow of display of a user terminal of a scratch game.
Figure 21:
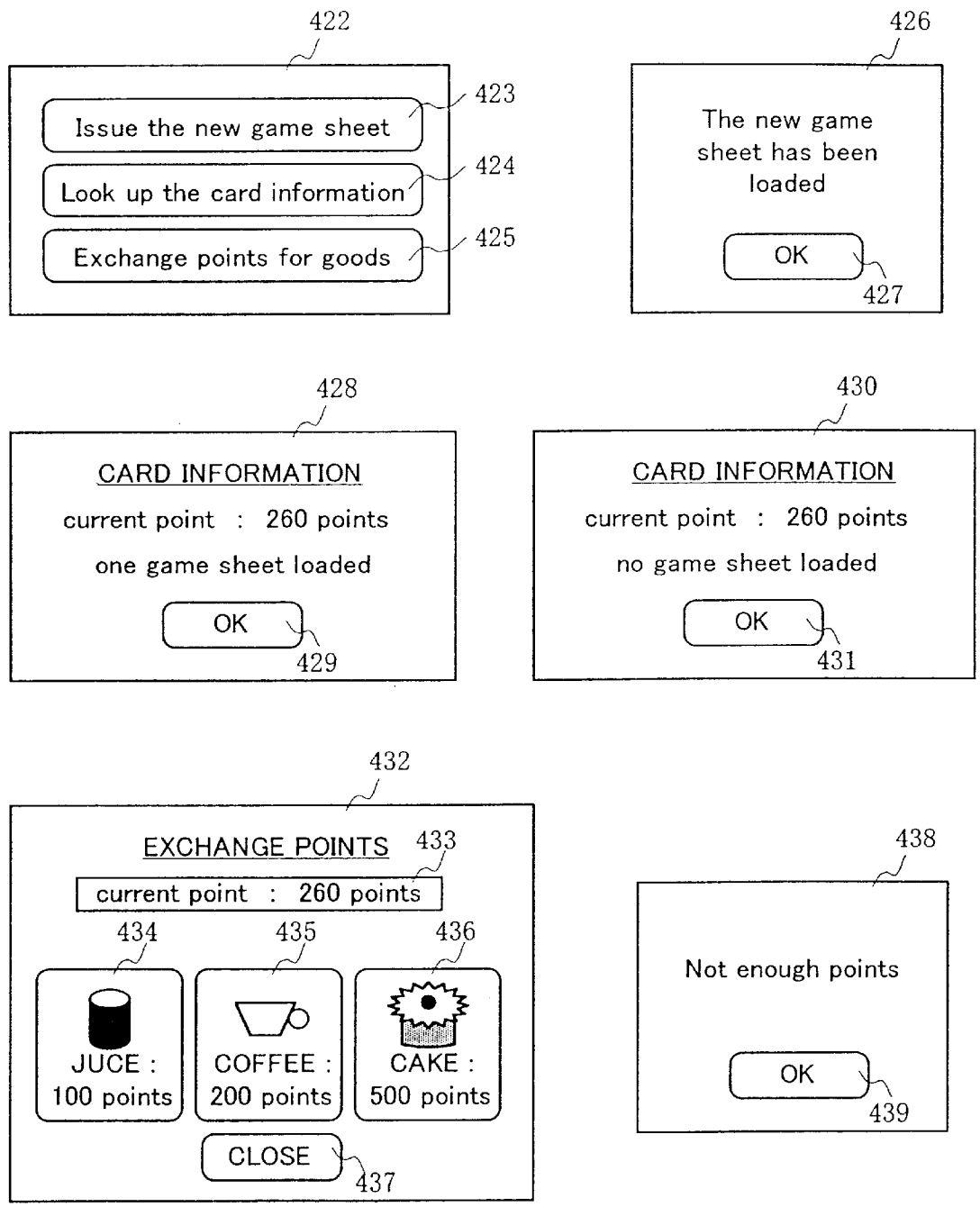
FIG. 21 illustrates a flow 1 of display of a shop terminal of a scratch game.
Figure 22:
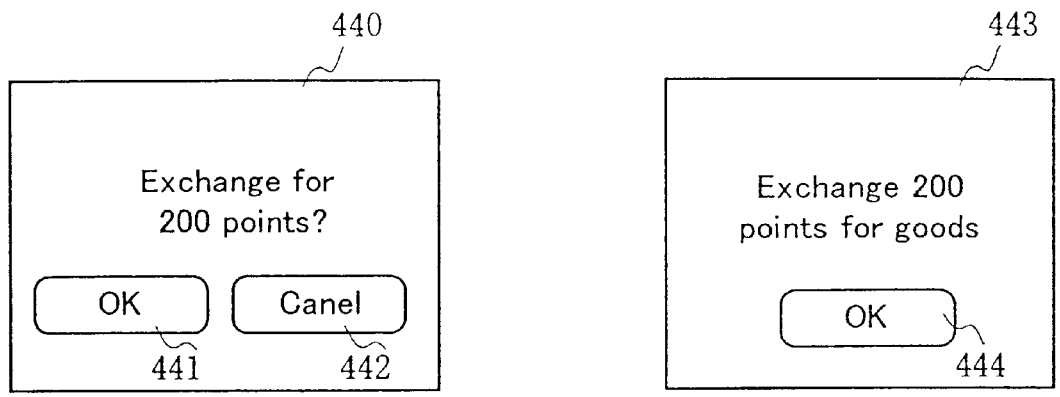
FIG. 22 illustrates a flow 2 of display of a shop terminal of a scratch game.
Figure 23:
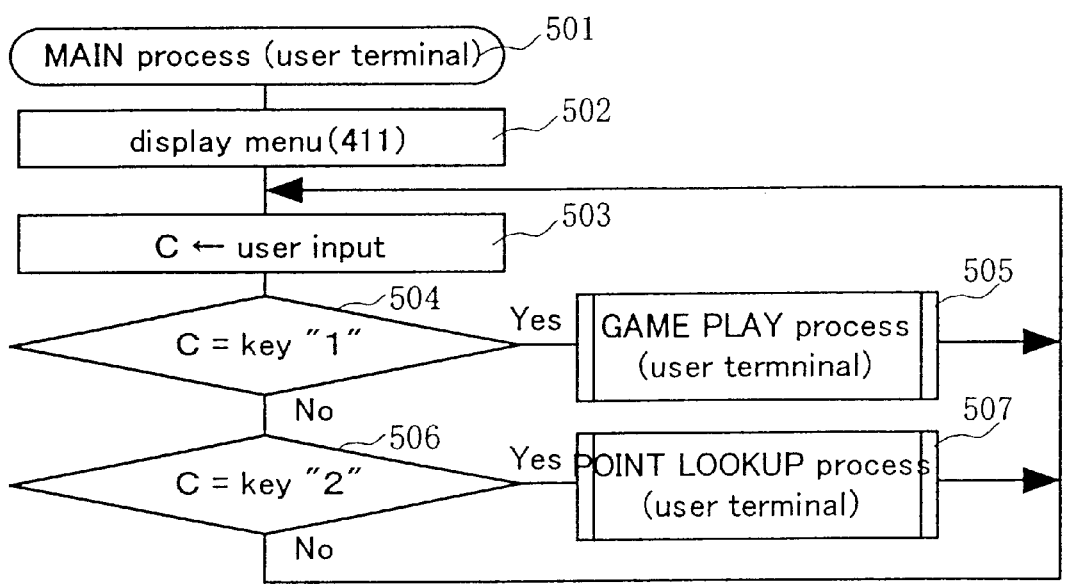
FIG. 23 illustrates a main process of a processing flow of a user terminal of a scratch game.
Figure 24:
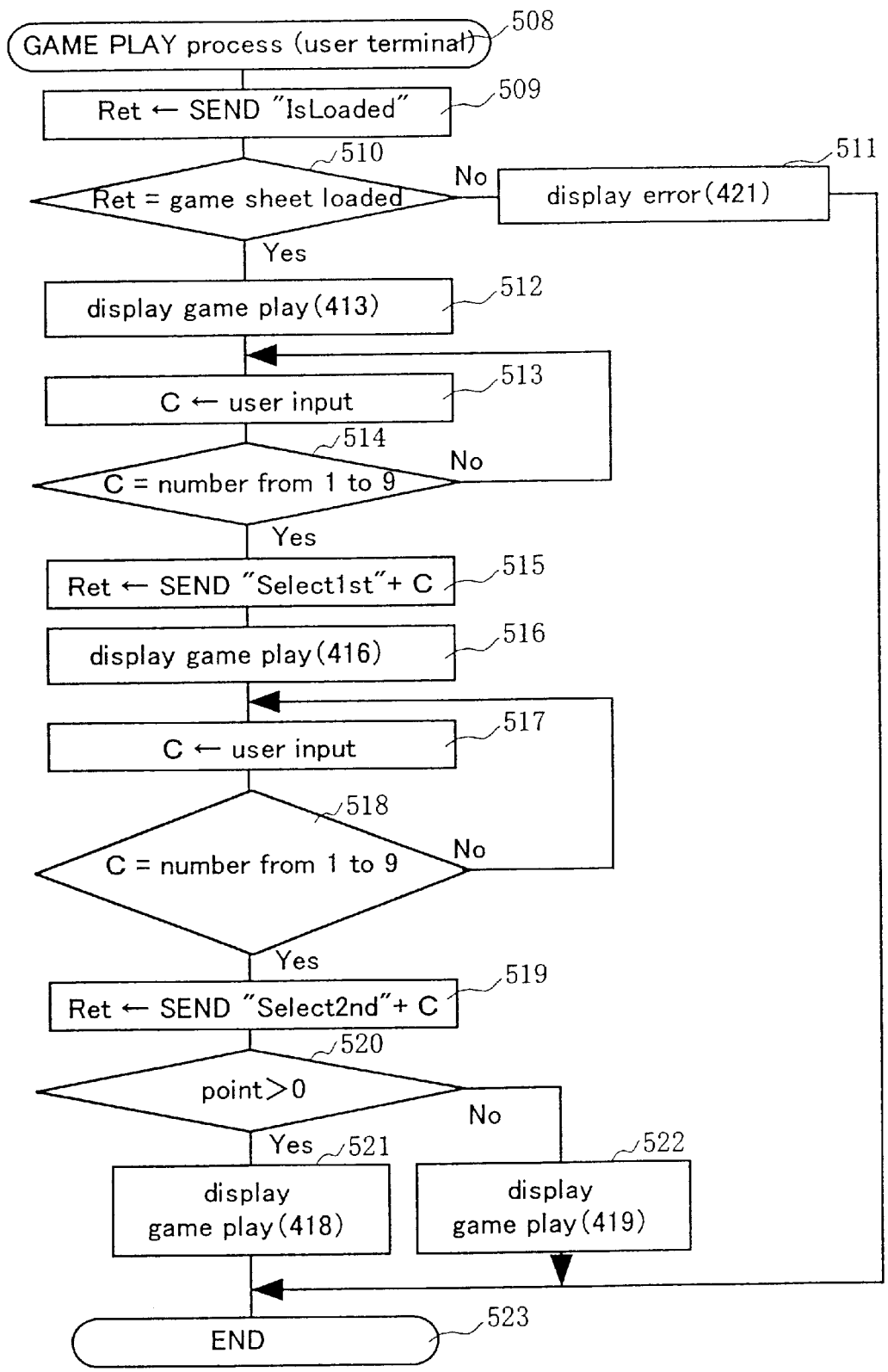
FIG. 24 illustrates a game execution process of a processing flow of a user terminal of a scratch game.
Figure 25:
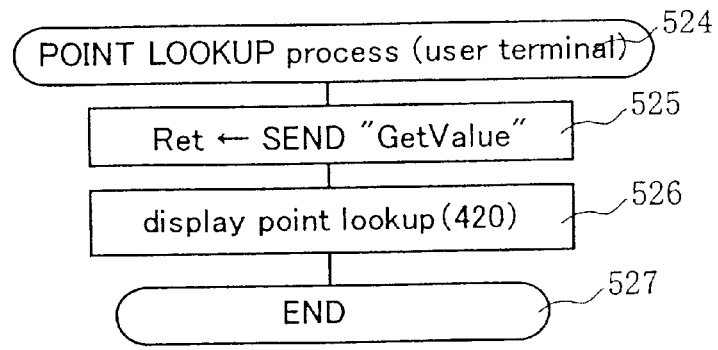
FIG. 25 illustrates a point check process of a processing flow of a user terminal of a scratch game.

Next, a scratch game application which is an embodiment of the present invention will be explained with reference to FIG. 17 to FIG. 38. Among these figures, FIG. 17 and FIG. 18 briefly illustrate operation example of the present application system. FIG. 19 illustrates a list of commands to the card from a terminal. FIG. 20 illustrates a flow of display of the user terminal. FIG. 21 and FIG. 22 respectively illustrate flow of display at the shop terminal. Moreover, FIG. 23 to FIG. 25 illustrates flow of process at the user terminal. FIG. 26 to FIG. 30 illustrates flow of process at the shop terminal. FIG. 31 to FIG. 38 illustrates flow of process of the card application, respectively.

In the scratch game, a plurality of boxes are given for one game and points are assigned to respective boxes. In this example, total of nine (9=3×3) boxes are given and each box is given the points of 10 points×3, 50 points×3 and 100 points×3. A user freely selects two boxes from these boxes. When the points assigned to the selected two boxes are matched, such points are added to the points. When the points not assigned to the selected two boxes are not matched, addition of point is not conducted. Pattern of one game is stored in the IC card and this game pattern is never played after it is once played.

An example of this scratch game can be regarded as the example nearest to the first example (game pattern is loaded to the card from the shop terminal, game is played depending on the game pattern and points are added) among the examples from the first to fifth examples explained above. The structure for presenting the intermediate process of the game play to the user terminal explained in FIG. 12 can also be realized.

Figure 17:
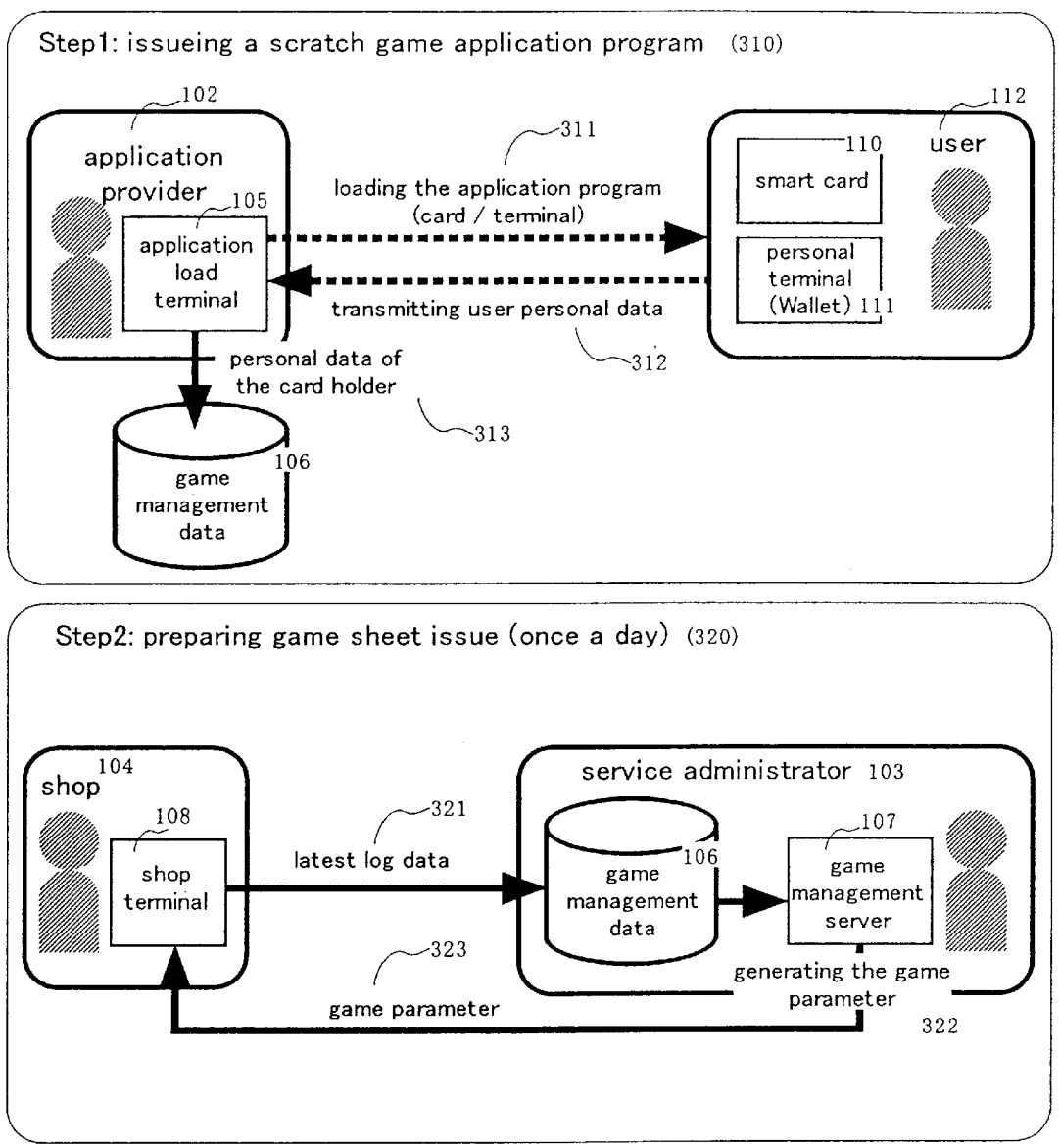
FIG. 17 illustrates a first operation example of a scratch game.
Figure 18:
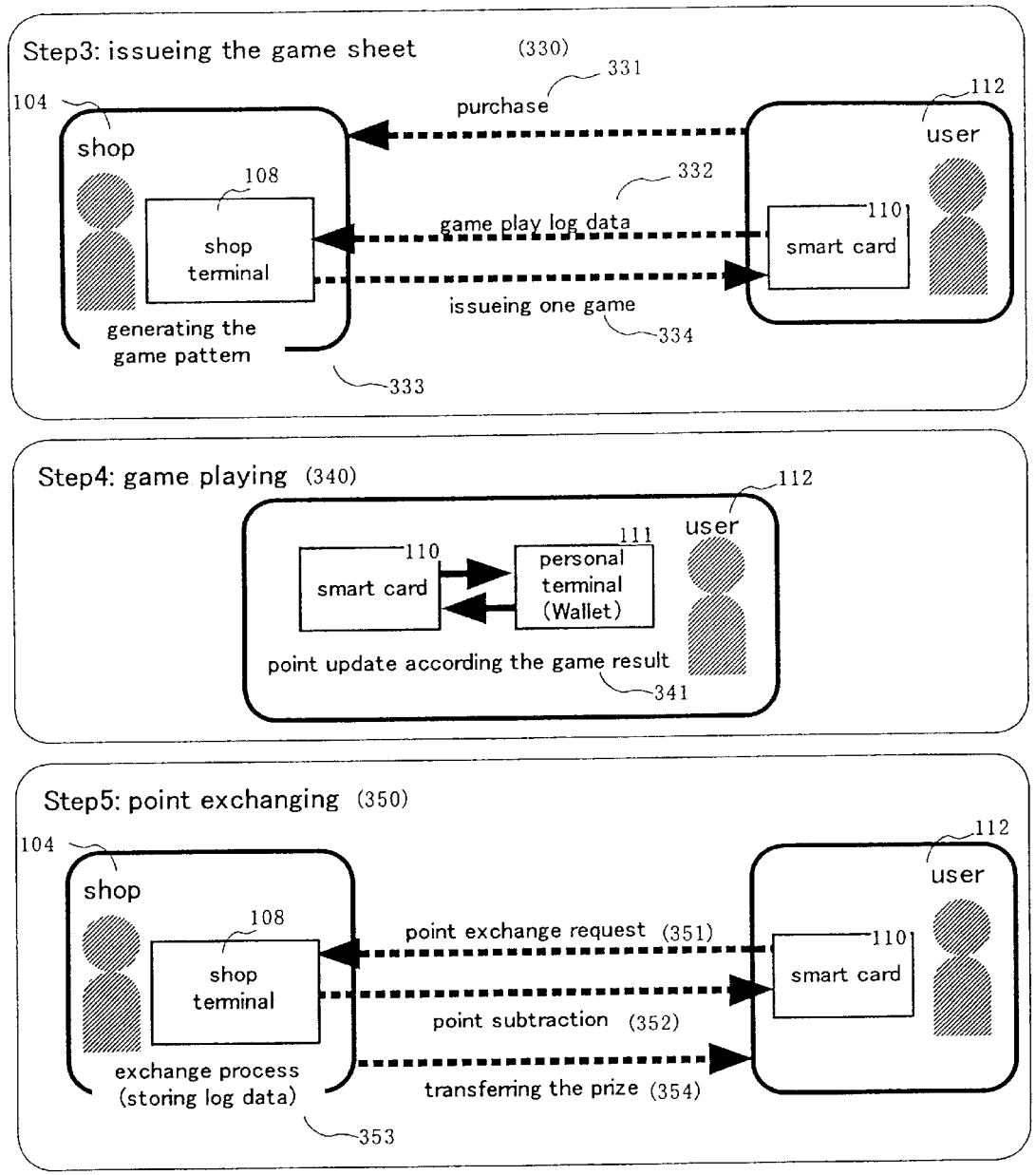
FIG. 18 illustrates a second operation example of a scratch game.

FIG. 17 and FIG. 18 illustrate an operation example of the present scratch game system. Operation can roughly be classified to five steps. The first step (310) is issuance of a scratch game application program, the second step (320) is preparation for issuance of the game sheet, the third step (330) is issuance of the game pattern, the fourth step (340) is playing of the game and the fifth step (350) is point exchange. These steps are sequentially explained below.

(First step) Issuance of the Scratch Game Application Program (310)

The application provider 102 issues, depending on proposal from the user 112, the scratch game application for the IC card 110 and the personal terminal 111 of the user 112. The application load terminal 105 loads the application program to both IC card 110 and the personal terminal 111 (311). On the occasion of loading, the application load terminal 105 receives the personal data information in the IC card 110 (312) and then transmits this data to the game management data 106 (313). Thereby, it may be administrated to what user the application has been loaded.

(Second step) Preparation for Issuance of the Game Sheet (320)

The service provider 103 administrates the game operating situation in a certain predetermined timing and distributes the game parameter to the shop 104. In this operation example, such process is conducted once a day. In the shop 104, the latest game log data consisting of various data such as number of times of issuance up to the yesterday, name of person responded the correct answer, amount of money returned accumulated in the shop terminal 108 is transmitted to the game management data 106 (321). These data are collected from each shop and the game parameter of that day (rate of hitting and amount of money as the prize of one game) is determined (322), considering the collected data, interlocking with the sales period and outside factor such as season. This game parameter is distributed to each shop (323).

(Third step) Issuance of the Game Pattern (330)

When the user 112 purchases goods at the shop 104, the shop terminal 108 issues a game pattern to the IC card 110 of the user 112 depending on amount of purchasing. At the time of issuance, the log data such as number of times of playing games and amount of money used for the purchasing accumulated in the IC card 110 are transmitted to the shop terminal 108 (332). The shop terminal 108 generates a game pattern based on the log data and the game parameter of that day stored previously (333). Here, one game pattern is issued to the IC card 110 (334).

(Fourth step) Playing of the Game (340)

The user 112 plays a game using the IC card 110 and the personal terminal 111. Depending on the result of the game, points are added (341).

(Fifth step) Exchange of the Point (350)

When points of the user 112 are accumulated, it may be exchanged by goods at the shop 104. When exchange request for goods depending on the points is sent (351), points can be exchanged with goods at the shop terminal 108 and stores the data on exchange (353). The points exchanged by goods are subtracted (352) and goods are transferred to user (354).

A method to realize above process flow using the IC card, the shop terminal and the personal terminal (user terminal) will be explained below. For the details of steps for issuance of the application and preparation for issuance of the game sheet, explanation is omitted here. The IC card program is executed when a command is transmitted from a terminal, process is executed depending on the parameter transmitted together with the command and the predetermined process sequence and after the data is stored, response is returned to the terminal. While, command is transmitted and response is received at the IC card, the processes are executed. Therefore, exchange of command/response between the IC card and terminal is a nucleus of the IC card system program.

FIG. 19 illustrates a list of commands to the card from terminal in the present application system. Total of six kinds of commands are used. Respective commands are explained below.

Command "LoadGame" (401) loads single pattern of scratch game, namely assignment of points to the card. As a parameter of command, game pattern is used and when the card receives the command and game pattern, it stores this game pattern to the memory. This command is issued only from the shop terminal.

Command "GetUserLog" (402) obtains game playing log data on user stored in the card. As the response, user log data is returned. This command is issued only from the shop terminal.

Command "GetValue" (403) searches a value of accumulated points in the card. As the response, the accumulated points in the card are returned. This command may be issued from any one desired of the user side terminal and the shop side terminal.

Command "SetValue" (404) sets the value of the accumulated point in the card. A value of points to be set is transmitted as a parameter. This command may be issued from any one desired of the user side terminal and the shop side terminal.

Command "IsLoaded" (405) searches whether the game pattern is loaded to the card or not. Result whether the game is loaded by the command "LoadGame" (401) or not is returned as the response. This command may be issued from any one desired of the user side terminal and the shop side terminal.

Command "Selec1st" (406) sends the first selection of box by user to the card. As a parameter of command, the first box number selected is used and as the response, point assigned to the relevant box is returned. Upon reception of command and selected box number, the card checks the points assigned to the box and it is then returned to the terminal. This command is issued only from the user side terminal.

Command "Select2nd" (407) sends the second selection of box by user to the card. As a parameter of command, the second box number selected is used and as the response, the result of the game and game pattern of this time are returned. Upon reception of command and selected box number, the card searches whether the point assigned to the relevant box is matched with the point of the first box selected or not. When these are matched, such point is defined as gain and when these are not matched, the gain is determined as 0 and it is then returned to the terminal together with the game pattern. In the card side, the game pattern stored is erased so that this game cannot be played again. This command is issued only from the user side terminal.

FIG. 20 illustrates flow of display at the user terminal in the present application system. An example of display will be explained with reference to eight displays from 411 to 421. In this example, input from user is conducted by the key input of numerals.

Display image 411 is the application selecting image. A user selects "Scratch Game" from the several applications. Thereby, the display image 412 is displayed. This is a menu display of the scratch game. A user can select any one of the game play ("1 PLAY GAME") or check of accumulated point ("2 CHECK VALUE") with the key 1 or 2. Here, a user is assumed to select the game play with key input "1" (413).

Display image 414 urges first selection of box. A user selects any one of the boxes from 1 to 9 with key input from 1 to 9. Here, a user is assumed to select the first box key input "1" (415).

When the game pattern is loaded to the card, the display image 416 is displayed. This display image prompts second selection of box. The first box selected by the first selection is opened and the point "50" assigned is displayed. A user selects any one (however, except for the first box selected) of the boxes from 1 to 9 with the key from 1 to 9 as in the case of the first selection. Here, eighth box is selected with key input "8" (417).

When the points assigned to the first box and eighth box are matched after key input "8" (417), the display image 418 is displayed. In this display image, a value 50 is added to the accumulated point.

When the points assigned to the first box and eighth box are not matched after key input "8" (417), the display image 419 is displayed.

When the check of accumulated point is selected with key input "2" from the menu image 412, the display image 420 is displayed. In this example, a point value is 260.

When the game pattern is not loaded to the card even if game play is selected with key input "1" from the menu image 412, the display image 421 is displayed. It is a message suggesting that game cannot be played because the game pattern is not loaded to the card.

Next, FIG. 21 and FIG. 22 illustrate flow of display images of the shop terminal in the present application system. Display examples will be explained with reference to eight figures from 422 to 443. In this example, an input of a shop staff is performed by selection of object on the display area using the pointing device such as mouse and touch panel.

Display image 422 is a menu image. As the menus to be selected, there are three kinds of menus of "menu for issuing a new game sheet" (423), "menu for looking up the card information" (424) and "menu for exchanging the point for goods"(425).

When the "menu for issuing a new game sheet" (423) is selected, the game pattern is written to the card and when the writing is completed, the check image such as display image 426 is displayed. When "OK" (427) is selected, this display is closed and the menu display 422 is returned.

When the "menu for looking up the card information" (424) is selected from the menu image 422, card information is verified and the display image 428 or 430 is displayed. The display image 428 corresponds to the case where only one game pattern is loaded to the card and the display image 430 corresponds to the case where no game pattern is loaded to the card. The menu image 422 is returned when "OK" (429) is selected in the display image 428 and when "OK" (431) is selected in the display image 430.

When the "menu for exchanging point for goods"(431) is selected in the menu display 422, display image 432 is displayed. Here, the value of accumulated point of card (433) and examples of goods for exchange, "Juice" (434), "Coffee" (436) and "Cake"(436) are displayed.

When "Cake"(436) is selected in the point exchange display 432, since a value of the accumulated point value is 260 while the point value for exchange is 500, a message image like the display image 438 is displayed. When "OK" (439) is selected here, the point exchange display image 432 is returned.

When "Coffee" (435) is selected in the point exchange display image 432, the check display image like the display image 440 is displayed. When "Cancel" (442) is selected here, the point exchange display image 432 is returned.

Here, when "OK" (441) is selected, the check display image of display 443 is displayed. When "OK" (439) is selected here, the point exchange display 432 where a value of point (433) 200 is subtracted from the preceding value is displayed.

Flow of process in the user terminal of the present application system will be explained with reference to FIG. 23 to FIG. 25. FIG. 23 illustrates the main process, FIG. 24 illustrates game playing process and FIG. 25 illustrates point check process, respectively.

FIG. 23 illustrates flow of process of the main process on the user terminal. When the process starts (501), menu display (411) is displayed (502). When the user input is set to "C"(503) and "C" is the key "1" (504), the user terminal game play process illustrated in FIG. 15 is executed (505) and the loop to wait for key input from a user is returned. When "C" is key "2"(506), user terminal point check process illustrated in FIG. 17 is executed (507) and the loop to wait for key input from user is returned. When "C" is never key 1 and key 2, the loop to wait for key input from user is returned.

FIG. 24 illustrates flow of a game playing process on the user terminal. When the process starts (508), the command "IsLoaded" (405) is sent to the card and this response is substituted to "Ret" (509). When "Ret" is never "game loaded" (510), error image (421) is displayed (511) to complete the process (523). When "Ret" is "game loaded" (510), the game display (414) is displayed (512) to wait for user input "C" (513). When "C" is other than the numerals from 1 to 9 (514), the loop to wait for user input is returned (513). When "C" is a numeral from 1 to 9, the command "Select1st" (406) is sent together with "C" to the card, the response thereof is substituted to "Ret" (515). The game display (416) in the form of displaying "Ret" to the selected box is displayed (516) to wait for "C"(517). When "C" does not satisfy the condition for difference from the first selection in the numerals from 1 to 9 (518), the loop to wait for input from user is returned (517). When "C" satisfies the condition for difference from the first selection in the numerals from 1 to 9 (518), the command "Select2nd" (407) is sent together with "C" to the card and the response thereof is substituted to "Ret" (519). Here, when gain is larger than 0(520), the game display (418) is displayed (421) and when gain is 0, the game display (419) is displayed (522) to complete the process (523).

FIG. 25 illustrates flow of point check process on the user terminal. When the process starts (524), the command "GetValue" (403) is sent to the card and the response thereof is substituted to "Ret" (525). Based on the value of "Ret", the point display image (420) is displayed (526) to complete the process (527).

Figure 26:
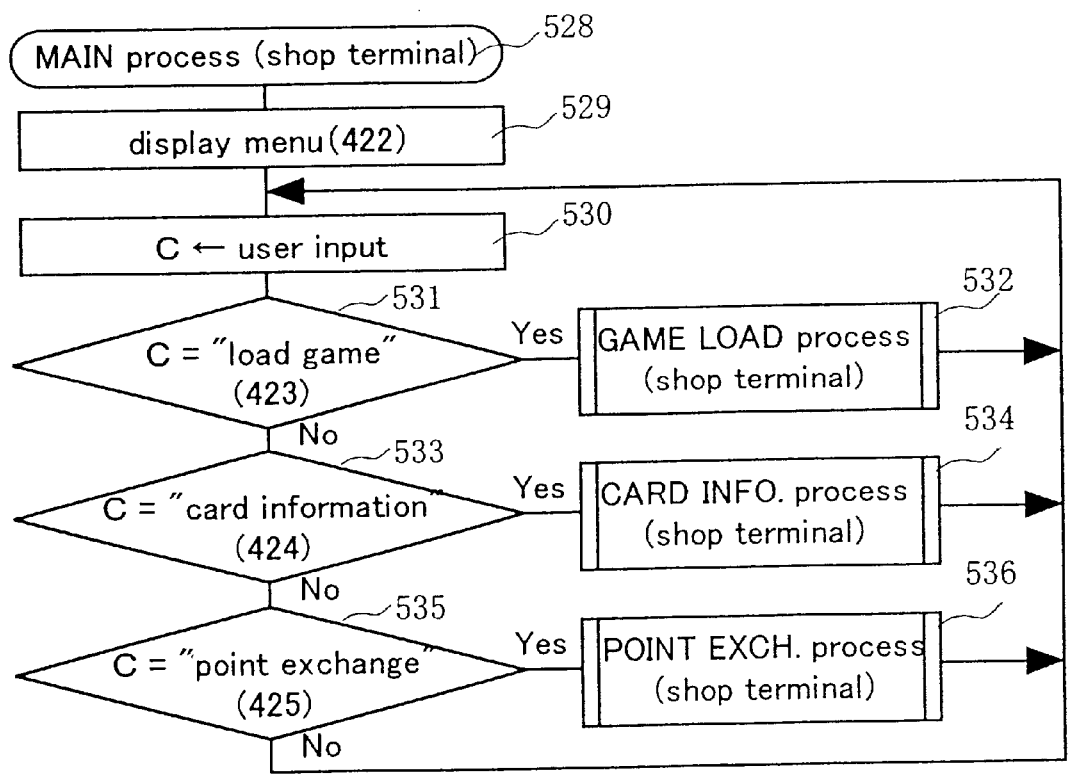
FIG. 26 illustrates a main process of a processing flow of a chop terminal of a scratch game.
Figure 29:
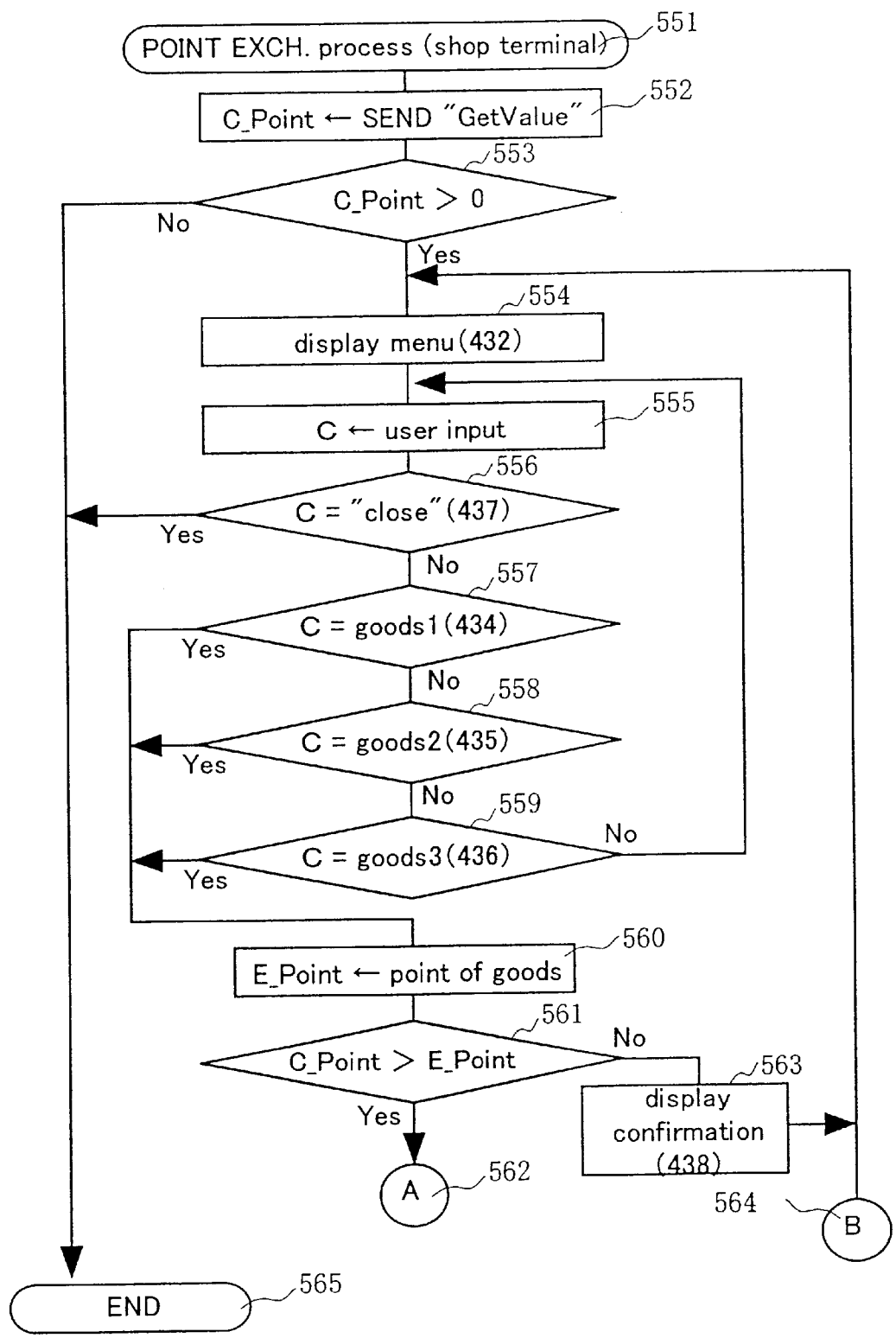
FIG. 29 illustrates a point exchange process 1 of a processing flow of a shop terminal of a scratch game.
Figure 30:
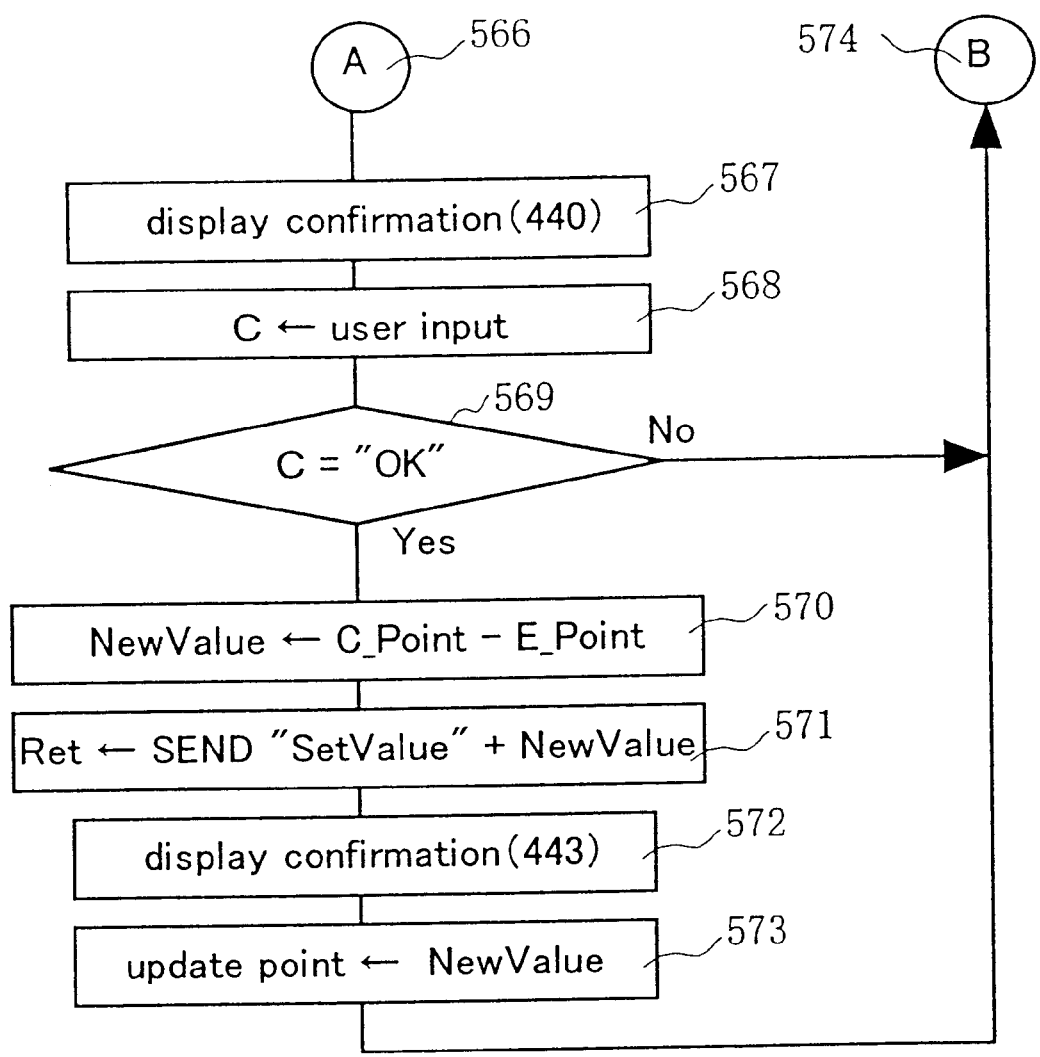
FIG. 30 illustrates a point exchange process 2 of a processing flow of a shop terminal of a scratch game.

Flow of process on the shop terminal in the present application will be explained with reference to FIG. 26 to FIG. 30. FIG. 26 illustrates the main process, FIG. 27 illustrates the game load process, FIG. 28 illustrates the card information presentation process and FIG. 29 and FIG. 30 illustrate the point exchange process.

FIG. 26 illustrates flow of the main process on the shop terminal. When the process starts (528), the menu display (422) is displayed (529). Selection of a user (a staff of shop) is set to "C" (530) and "C" corresponds (531) to "game load" (423), the shop terminal game load process illustrated in FIG. 27 is executed (532) and the loop to wait for selection of the user is returned. When "C" corresponds (533) to "card information"(424), a shop terminal card information presentation process illustrated in FIG. 28 is executed (534) and the loop to wait for selection from user is returned. When "C" corresponds (535) to "point exchange process" (425), the shop terminal point exchange process illustrated in FIG. 29 and FIG. 30 is executed (536) and the loop to wait for selection from user is returned. When "C" does not correspond to any process explained above, the loop to wait for selection from user is returned.

Figure 27:
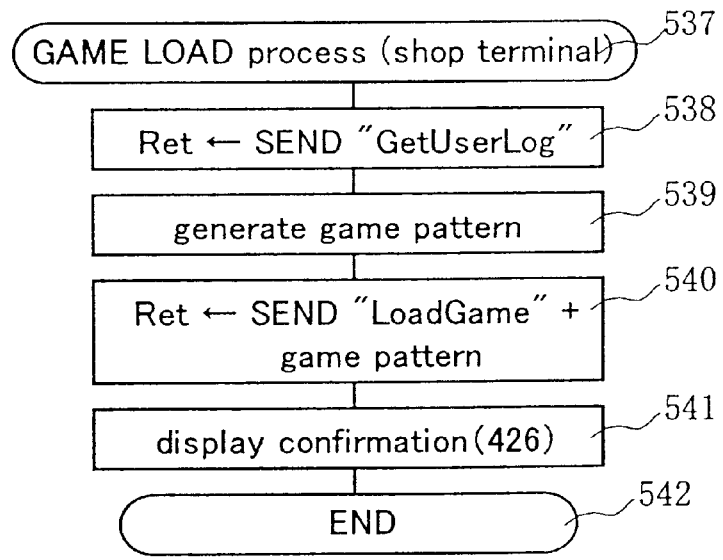
FIG. 27 illustrates a game loading process of a processing flow of a shop terminal of a scratch game.

FIG. 27 illustrates flow of the shop terminal game load process. When the process starts (537), the command "GetUserLog" (402) is sent to the card and the response thereof is substituted to "Ret" (538). With the value and random number, the game pattern is generated (539) and the command "LoadGame" (401) is transmitted (540) to the card, using the game pattern generated as a parameter. Here, the check display image (426) is displayed (541) to complete the process (542).

Figure 28:
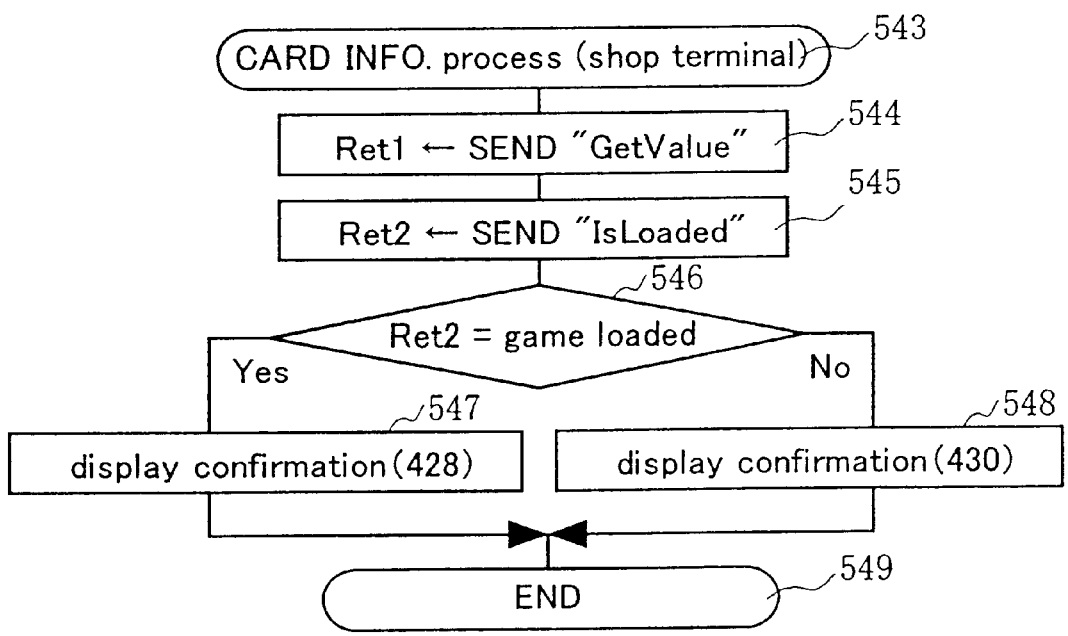
FIG. 28 illustrates a card data showing process of a processing flow of a shop terminal of a scratch game.

FIG. 28 illustrates flow of the shop terminal card information presentation process. When the process starts (543), the command "GetValue"(403) is sent to the card and the response thereof is substituted to "Ret1" (544), subsequently the command "IsLoaded"(405) is sent and the response thereof is substituted to "Ret2" (545). When "Ret2" corresponds to "game loaded" (546), the check display (428) is displayed (547) and it is never "game loaded", the check display (420) is displayed (548) to complete the process (549).

FIG. 29 and FIG. 30 illustrate flow of the shop terminal point exchange process. When the process starts (551), the command "GetValue" (403) is sent to the card and the response thereof is substituted to "C_Point" (552). When "C_Point" does not larger than 0 (553), the process is completed (562). When "C_Point" is larger than 0 in (553), the good select display (432) is displayed (554). When the user (the staff of the shop) input is set to "C" (555) and "C" corresponds to "close" (556), the process is completed (565). When "C" corresponds (557), (558), (559) to "goods 1"(434) or "goods 2" (435) or "goods 3" (436), the point of goods corresponding to "E_Point" is substituted (560). When "C" does not correspond to any one listed above, the loop to wait for selection from user is returned. When the process (560) is executed, values of "C_Point" and "E_Point" are compared with each other (561). When "C_Point" is larger than "E_Point", the process (562) is executed following the process (A) of FIG. 30. When "C_Point" is not larger than "E_Point", the check display (438) is displayed (563) and the display (554) of the goods selection display (432) is returned. In the process (A) (566) continued from FIG. 29, the check display (440) is displayed (567). When user input is set to "C" (568) and "C" does not correspond to "OK" (569), display (554) of the goods selection display (432) of FIG. 21 is returned via the process (B) (574). When "C" corresponds to "OK" in the process (569), a value obtained by subtracting "E_Point" from "C_Point" is substituted to "NewValue" (570) and "Set-Value" (404) is sent to the card using "NewValue" as a parameter (571). Here, the check display (443) is displayed (572) to update the point value to "NewValue" (573) and display (554) of the goods selection display (432) of FIG. 21 is returned via the process (B) (574).

Figure 31:
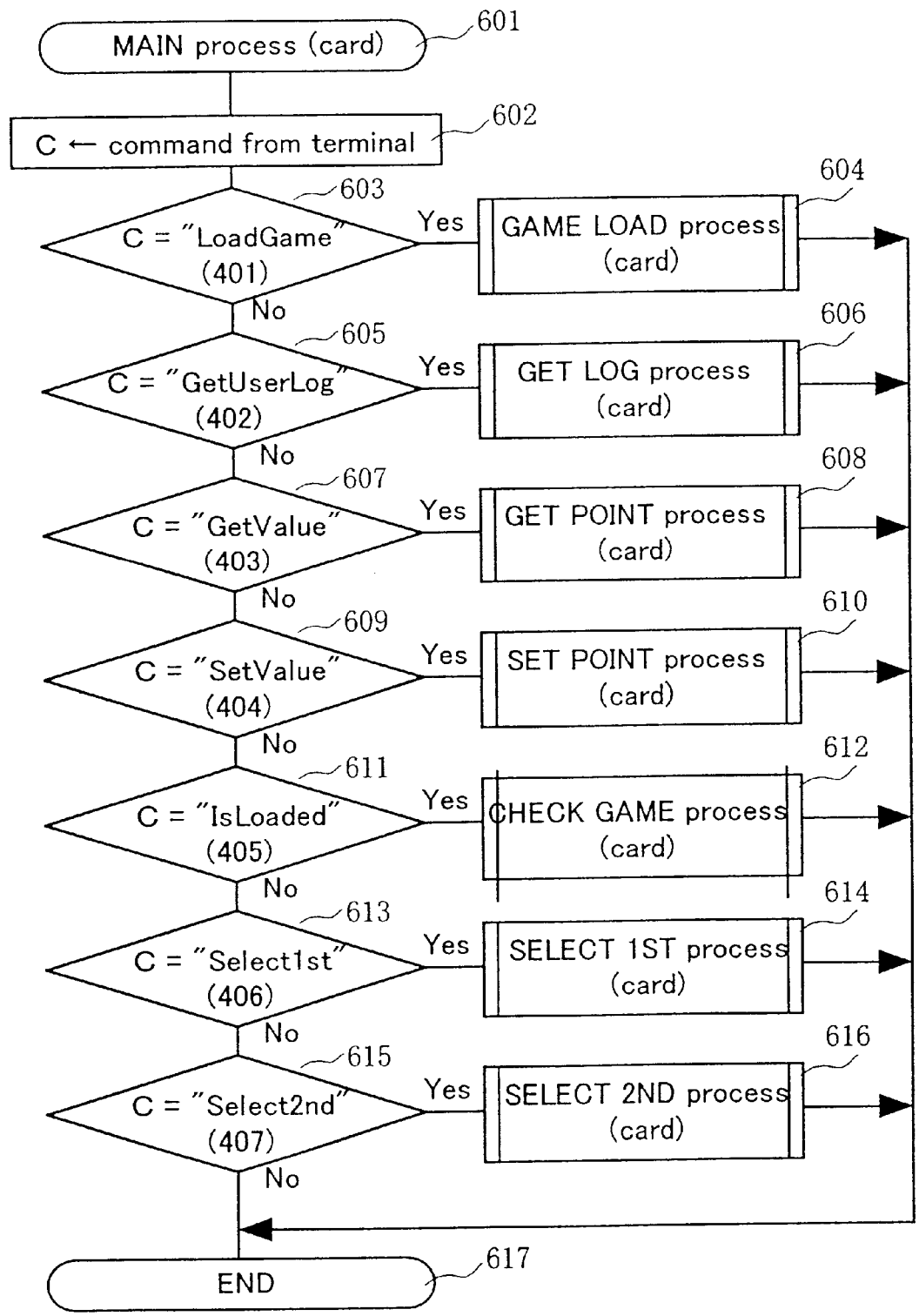
FIG. 31 illustrates a main process of a card process of a scratch game.
Figure 32:
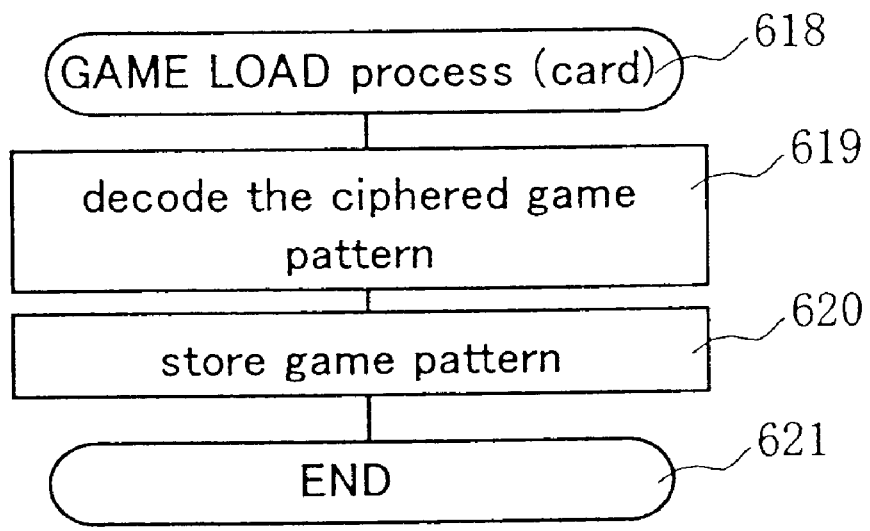
FIG. 32 illustrates a game loading process of a processing flow of a scratch game.
Figure 33:
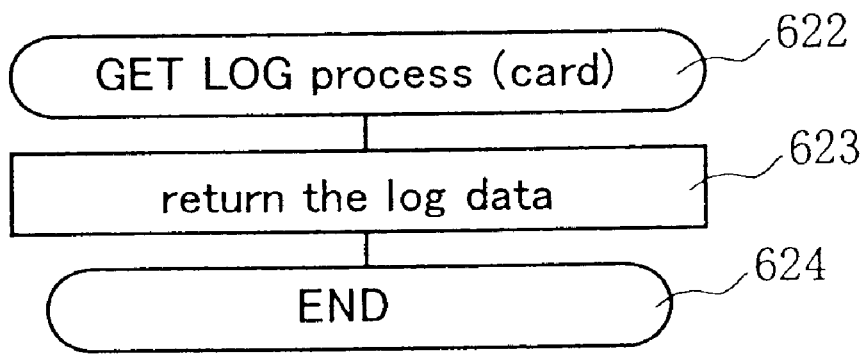
FIG. 33 illustrates a user log acquiring process of a card processing flow of a scratch game.
Figure 34:
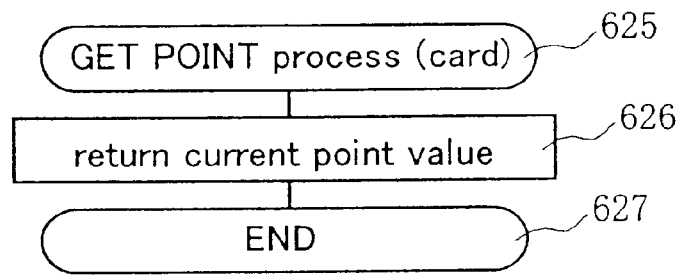
FIG. 34 illustrates a point acquiring process of a card processing flow of a scratch game.
Figure 35:
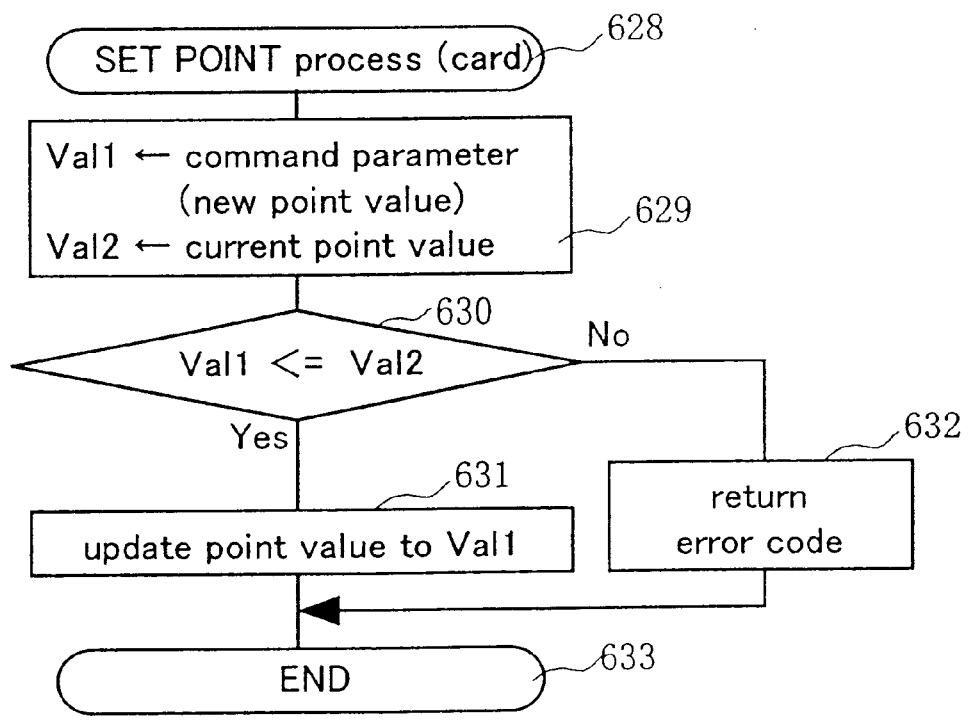
FIG. 35 illustrates a point set process of a card processing flow of a scratch game.
Figure 36:
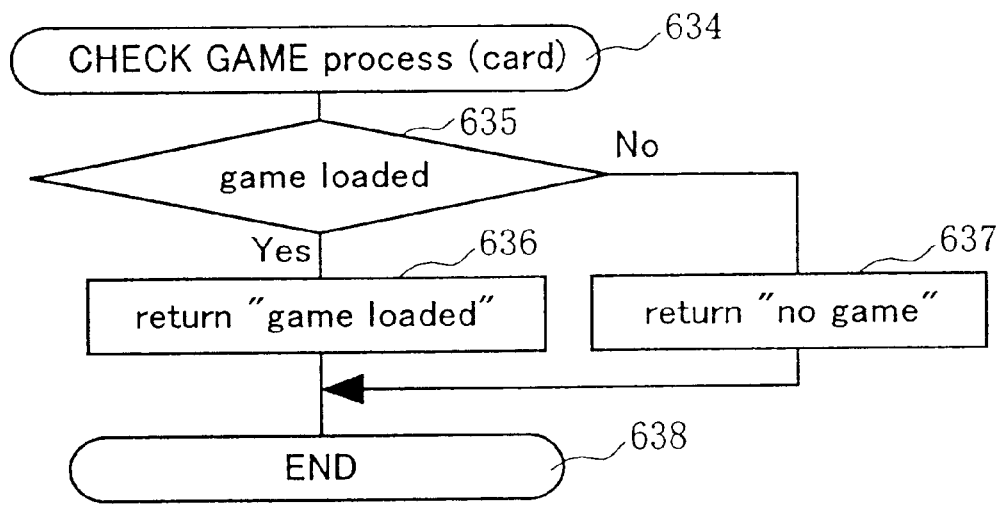
FIG. 36 illustrates a game load check process of a card processing flow of a scratch game.
Figure 37:
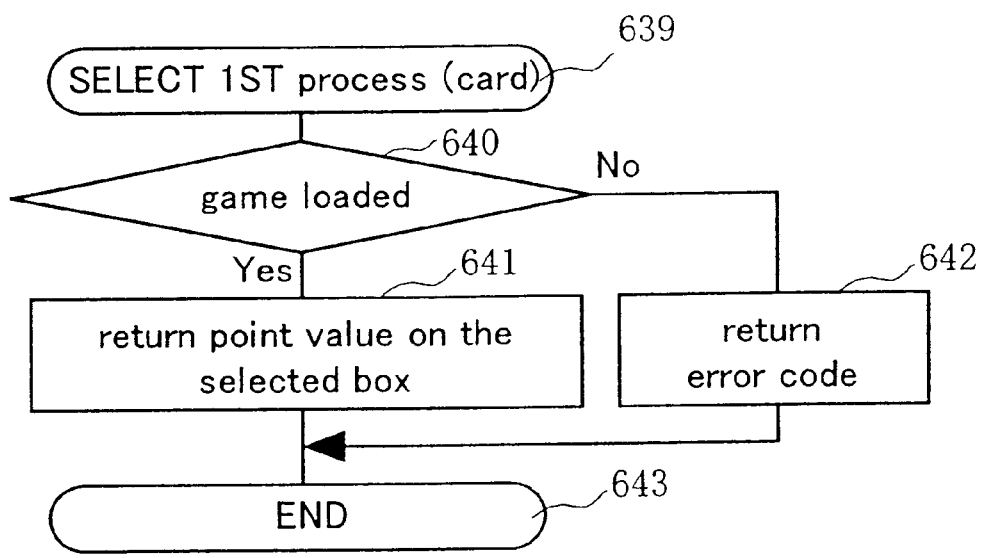
FIG. 37 illustrates a first selection process of a card processing flow of a scratch game.

Flow of the card application process in the present application system is illustrated in FIG. 31 to FIG. 38. FIG. 31 illustrates the main process; FIG. 32, the game load process; FIG. 33, the user log data acquiring process; FIG. 34, the point acquiring process; FIG. 35, the point set process; FIG. 36, the game load check process; FIG. 37, the first selection process and FIG. 38, the second selection process, respectively.

Figure 38:
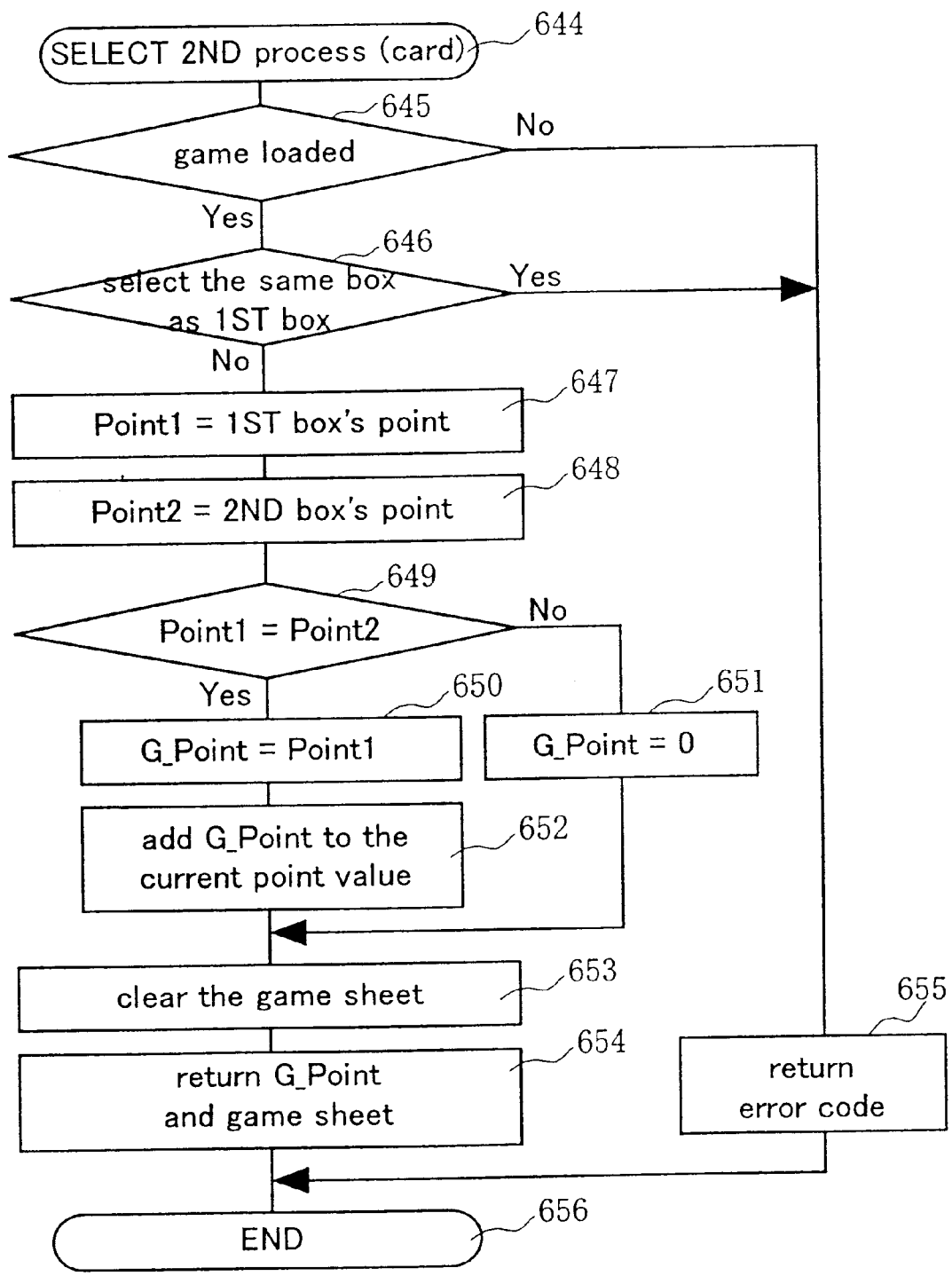
FIG. 38 illustrates a second selection process of a card processing flow of a scratch game.

FIG. 31 illustrates flow of the main process of the card application. When the process starts (601), a command from the terminal is set to "C" (602). When "C" is the "command LoadGame" 401 (603), the game load process of the card illustrated in FIG. 32 is executed (604) and is then completed (617). When "C" is the command "GetUserLog" 402 (605), the game load process (606) of the card illustrated in FIG. 33 is conducted and is then completed (617). When "C" is the command "GetValue" 403 (607), the point acquiring process of the card illustrated in FIG. 34 is executed (608) and is then completed (617). When "C" is the command "SetValue" 404 (609), the point set process (610) of the card illustrated in FIG. 35 is executed and is then completed (617). When "C" is the command "IsLoaded" 405 (611), the game load check process of the card illustrated in FIG. 36 is executed (612) and is then completed (617). When "C" is the command "Select1st" 406, the first selection process of card illustrated in FIG. 37 is executed (614) and is them completed (617). When "C" is the command "Select2nd" 407, the second selection process of card illustrated in FIG. 38 is executed (616) and is then completed (617).

FIG. 32 illustrates flow of the game load process of the card application. When the process starts (618), composite process of the game pattern received as a parameter is executed (619) and the game pattern received as a parameter is stored in the memory (620) and is completed (621).

FIG. 33 illustrates flow of the user log acquiring process of the card application. When the process starts (622), the user log stored in the memory is returned (623) as the response to complete the process (624).

FIG. 34 illustrates flow of the point acquiring process of the card application. When the process starts (625), the current point value stored in the memory is returned (626) as the response to complete the process (627).

FIG. 35 illustrates flow of the point set process of the card application. When the process starts (628), a value of the point to be set newly received as a parameter of command is set to "Val1", while the current point value to "Val2" (629). The value of "Val1" is compared with the value of "Val2" (630) and when "Val1" is equal to or smaller than "Val2", a value of point received as a parameter is stored in the memory (631) and the process is completed (633). When "Val1" is larger than "Val2", an error code is returned (632) to complete the process (633). This process is conducted for security so that a value which is illegally larger than the current value is no longer set as the point value. This command considers that it is called (571) only as a part of the point exchange process from the shop terminal.

FIG. 36 illustrates flow of the game load check process of the card application. When the process starts (634), whether the game is stored in the memory or not is checked (635). When the game is stored, "loaded" is returned (636) and when the game is not yet stored, "unloaded" is returned (637) and the process is completed (638).

FIG. 37 illustrates flow of the first selection process of the card application. When the process starts (639), whether the game is stored in the memory or not is checked (640). When the game is stored, the value of point corresponding to the first selection box is returned as the response (641) and when the game is not stored, an error code is returned (642) to complete the process (643).

FIG. 38 illustrates flow of the second selection process of the card application. When the process starts (644), whether the game is stored in the memory or not is checked (645). When the game is not stored, an error code is returned (655) to complete the process (656). When the game is stored in the memory in the step (645), it is checked that the box number selected this time is never matched with the number selected first (646). When it is matched with the number selected first, an error code is returned (655) to complete the process (656). When the box number which is different from the number selected first is selected, the point corresponding to the box selected first is substituted to "Point1" (647) and the point corresponding to the second selected box is substituted to "Point2" (648). Here, "Point1" is compared with "Point2" (649). When both are not equal, "0" is substituted to "G_Point" (651). When both are equal in the step (649), "Point1" is substituted to "G_Point" (650) and "G_Point" is added to the value of accumulated point stored in the memory and a new value is stored (652). Thereafter, this game pattern is cleared from the memory (653) and a value of "G_Point" and game pattern are returned (654) to complete the process (656).

In the example of scratch game explained above, in view of simplifying the explanation, only one game pattern can be loaded by the single loading operation and only one game stored in the card can be executed continuously while playing the game. However, it is also possible to continuously executing a plurality of games by loading simultaneously a plurality of games and storing a plurality of games. Moreover, in this example, the scratch game in which a user can select two boxes using nine (=3×3) boxes has been explained but the invention can be applied easily to the other variations by freely setting the total number of boxes and the number of boxes to be selected.

Figure 39:
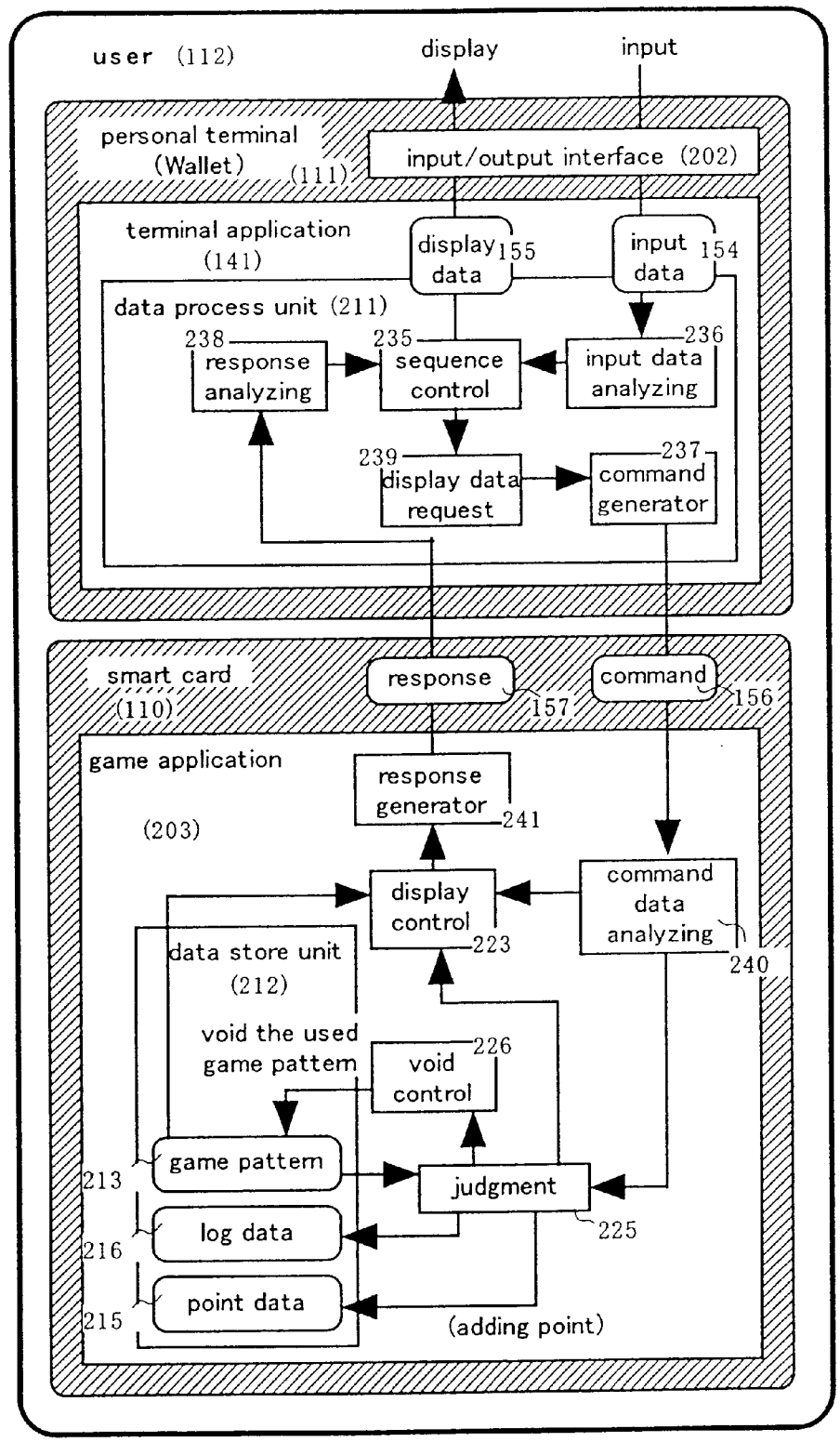
FIG. 39 illustrates a system structure and another structure of a game execution process of a processing flow.

FIG. 39 illustrates the other structure of a game playing process in the system structure and flow of process illustrated in FIG. 10 and FIG. 11. FIG. 39 illustrates the game application 203 loaded to the IC card 110 by the user 112 and the system structure to execute the game pattern 213 using the personal terminal 111.

In this structure, a problem how effectively present the progressing situation to user depending on the progress of the game is solved. First, importance of presentation of the progressing situation will be explained first.

In an ordinary game, the game play sequence control unit 235 in the personal terminal 111 generates a plurality of commands and then transmits these commands to the IC card 110. The game application 203 in the IC card 110 executes the commands and the result of the game is returned to the personal terminal 111 as the response. For example, in the scratch game application illustrated in FIG. 20, the four commands in total of second box selection and request of the game result are transmitted in the game selection phase 412, first box selection phase 414, second box selection phase 416. Here, attention is paid to the first box selection 414. In the embodiment of FIG. 20, the point value "50" assigned to the box selected as the response to the selected command is returned and the terminal application displays this point (416).

However, the information indicating that the relevant box is surely selected is required in minimum as the response information for box selection command. In the method of obtaining only this information, the terminal application changes the selected box 1 to the white number 1 from the white number 1 on the black background but does not display the point assigned to the box. When the second box is selected, the points acquired ("50" point in this case) is displayed as the text. When this method is compared with the former method, any difference lies in both methods from the viewpoint of the points acquired by the user. However, from the viewpoint of interesting, the former method to display the point of box is preferable. For example, when the first box is selected and a higher point value is displayed, further expectation is occurring due to the second box selection, and a user may apparently be excited.

In order to attain the purpose of effective presentation of the game progressing situation explained above, a display data requesting unit 239 is provided in a terminal application 141 within the personal terminal 111 and the display data control unit 223 in the game application 203 of the IC card 110 in the embodiment illustrated in FIG. 39. Here, the display data requesting unit 239 has a function to request the response of information in what degree as a result of the game application process in the IC card process based on the user input data. The display data control unit 223 has a function to select and acquire the information requested from the game pattern 213 depending on the request of the display data requesting unit 239.

In the following explanation, an example of structure of the game process illustrated in FIG. 39 will be explained in detail with an example of the playing elements 414 to 419 of the scratch game illustrated in FIG. 20. The pattern void control unit 226, log data 216 among the structural elements in the game application 203 and the point data 215 are similar to those indicated in the other embodiment and these are not explained here.

Total flow of the game play is controlled by the game play sequence control unit 235 of the terminal application. Here, the game play sequence control unit has the function to sequentially execute the three processes of (1) first box selection request transmission, (2) second box selection request transmission and (3) result determination request transmission.

First, in the first box selection request transmission process (1), the display image 414 is displayed to user to wait for the box number which is input by the user. When a user executes the key input "1"(415), the input data is sent to the input data analyzing unit 236. Thereby, the game play sequence control unit 235 starts the display data requesting unit 239 using the input data as a parameter. The display data request unit transmits the instruction information to include the point value assigned to the selected box in the response to the command generator 237. The command generator 237 generates the first box selection command using, as a parameter, two pieces of information about the box number "1" input by the user and an instruction to include the point assigned to the box to the response and then transmits these pieces of information to the IC card 110.

The first box selection command transmitted to the IC card is stored in an input command analyzing unit 240 and is developed to two pieces of information about the box number "1" and instruction to include the point assigned to the box to the response. The former box number "1" is sent to the result judgment unit 225. The result judgment unit 225 refers to the game pattern 213 to extract the point value (50 point in the example of FIG. 20) assigned to the box number "1" and stores this point value to the job area not illustrated for the result judgment process explained later. Meanwhile, two pieces of information about the box number "1" and the instruction to include the point assigned to the box to the response is then sent to the display data control unit 223. The response generator transmits a pair of the box number "1" and point value "50" to the personal terminal 111 as the response to the first box selection command. The game play sequence control unit 235 in the terminal application 141 analyzes the response data on the first box selection command in the response analyzing unit 238 and displays the display data 155 extracted from the response to user via the input/output interface 202. The flow of first box selection command process is explained above.

Next, the game play sequence control unit 235 executes the second box selection request transmission process. As illustrated in the example 416 of FIG. 20, the process similar to the first box selection request transmission process is conducted to the user key input "8". As a result of process, the point value "50" assigned to the box number "8" is stored in the job area of the result judgment unit. As a result, a pair of box number "8" and the point value "50" is returned to the personal terminal 111 as the command response value and is then displayed to user via the input/output interface 202. Thereby, explanation of flow of the second box selection command process is completed.

Finally, the game play sequence control unit 235 of the terminal application executes the result judgment request transmission process. The result judgment request command is transmitted to the result judgment unit 225 in the IC card 110 from the command generator 237. The result judgment unit inspects whether the point values of two boxes stored in the job area at the inside are equal or not as a result of the couple of box selection command processes. In the example of FIG. 20, since box 1 and box 8 are equal in the point value "50" and the result judgment unit returns the data, as the command response value, that user has attained the correct answer to obtain 50 point. The game play sequence control unit 235 generates the display data 155 based on the command response value and displays that user attains the correct answer and obtains 50 point as illustrated in display image 418.

Explanation of flow of the process in the other structure of the game play process illustrated in FIG. 39 is completed above. In above explanation, playing of the game comprises three commands. However, it is also apparent that the game can be played only with two commands of the box selection request processes as illustrated in the example of FIG. 24 by providing the process that the second box selection request process can sequentially start the box selection process and result judgment process in the game application 203 of the IC card 110. As explained above, the game progressing situation can effectively be presented in this embodiment by providing the display data requesting unit 239 in the terminal application 141 in the personal terminal 111 and also providing the display data control unit 223 in the game application 203 in the IC card 110.

Detail flow of process of a scratch game has been explained above and this application example can also be applied to generation of the game pattern in the card using the second example and management of point with the other application using the fifth example. Moreover, game pattern of various patterns such as application examples of the game play can be considered based on the game system for judging the result by the user input timing of the third example or game pattern consisting of question data and answer data in the fourth example, but detail explanation about these are omitted here.

Figure 40:
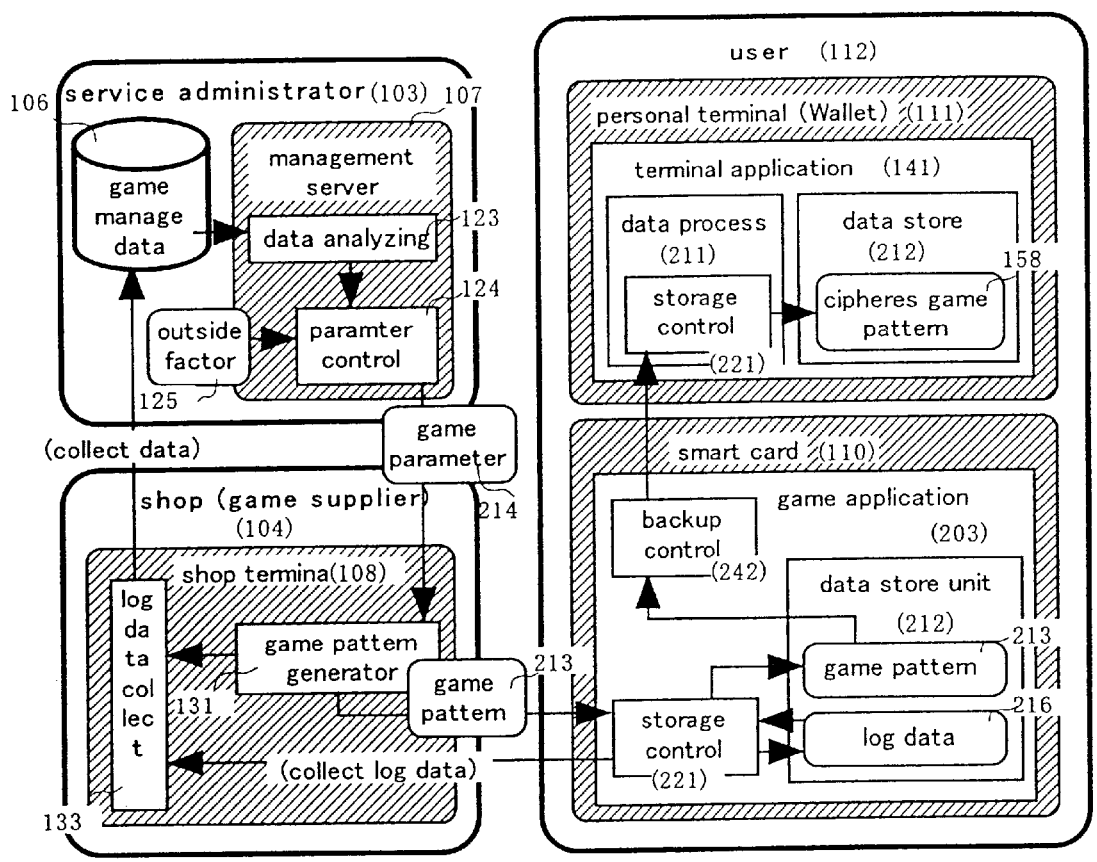
FIG. 40 illustrates a system structure and a game issuing process in a sixth example of a processing flow.
Figure 41:
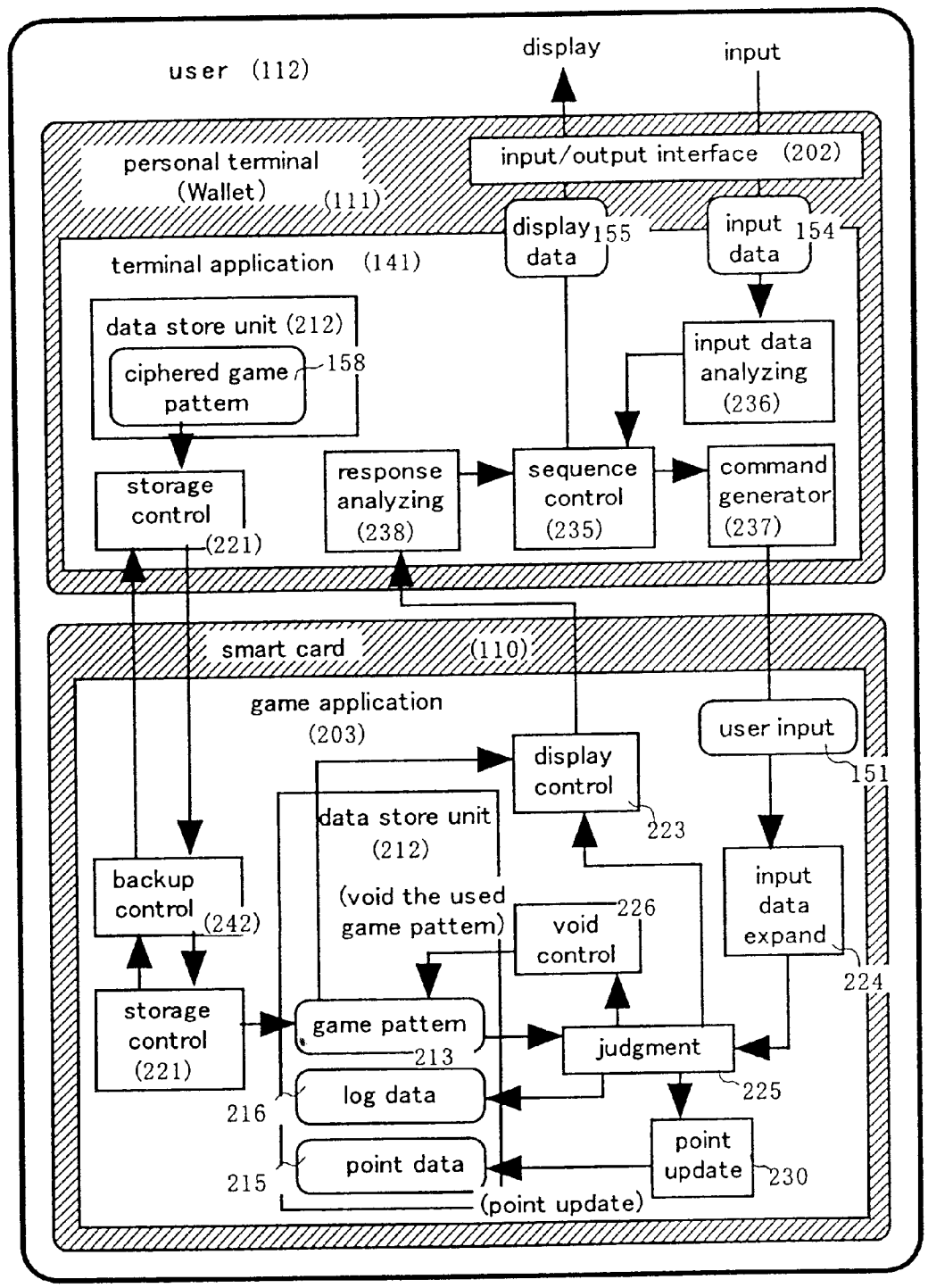
FIG. 41 illustrates a system structure and a game issuing process in a sixth example of a processing flow.

FIG. 40 and FIG. 41 illustrate a system structure and a flow of the process of an example for saving the game pattern to the user terminal as a sixth example of the game system using the IC card realized by the present invention. Here, corresponding to FIG. 9 and FIG. 10 of the first example, the game issuing process is illustrated in FIG. 40 and game playing process in FIG. 41. The other processes are similar to the first example and therefore explanation thereof is omitted here.

FIG. 40 illustrates a system structure and a flow of process of the game issuing process of the sixth example. Prior to game play by the user, the shop terminal 108 loads the game pattern 213 to the IC card 110. The data store control unit 221 of the IC card 110 deciphers the ciphered game pattern and stores it to the game pattern store unit in the data store unit 212. However, since the memory capacity of the IC card 110 is limited, it is considered to temporarily back up the game pattern loaded on the card to the personal terminal 111. When the game pattern 213 is backed up to the personal terminal 111, pattern data may be previously detected by the user. Therefore, a pattern backup control unit 242 ciphers the game pattern and sends the ciphered game pattern to the personal terminal 111. The personal terminal 111 receives this game pattern and stores a ciphered game pattern 158 in the data store unit 212 of the user terminal by the data store control unit 221. In this case, the data store control unit 221 is requested to memorize the game pattern ID for the management of patterns being stored.

FIG. 41 illustrates a system structure of a flow of process of the game play process of the sixth example. When a user plays the game, the requested pattern ID is sent to the data store control unit 221 in the side of the personal terminal 111 from the pattern backup control unit 242 in the side of the IC card 110, the game pattern having the ID requested from the ciphered game pattern 158 is transmitted to the IC card 110 from the data store control unit 221 and the transmitted pattern is deleted. The pattern backup control unit 242 in the side of the IC card 110 sends the received game pattern to the data store control unit 221. The data store control unit 221 deciphers the game pattern and stores it in the data store unit 212. The subsequent game play process is same as that in FIG. 10. When result is judged, this game pattern is voided for control so that reference is no longer performed to the referred data for playing the next and subsequent games. Thereby, the explanation of the sixth example of the game system using the IC card realized by the present invention is completed.

Following profiles are also apparently included in the present invention.

(1) An application load terminal, which issues a program storing the game pattern:

An IC card terminal enabling exchange of data with the IC card, characterized in loading, to such an IC card, the program including following steps of:

storing the input game pattern to the data store unit;

collating user input through the input/output interface with the game pattern and then outputting the result of collation;

accumulating, depending on the game results, the point assigned to the game pattern to the point data on data store unit;

storing the log data regarding the game play to the log data store unit of the data store unit; and voiding the played game pattern.

(2) An application load terminal, which issues a program generating the game pattern:

An IC card terminal enabling exchange of data with the IC card, characterized in loading, to such an IC card, the program including following steps of:

generating the game pattern, based on the predetermined algorithm, depending on the data regarding the number of times of play of input game and then storing such game pattern to the data store unit;

collating user input through the input/output interface with the game pattern and then outputting the result of collation;

accumulating, depending on the game results, the point assigned to the game pattern to the point data on data store unit;

storing the log data regarding the play of the game to the log data store unit of the data store unit; and voiding the played game pattern.

(3) An application load terminal, which issues a program having no game pattern:

An IC card terminal enabling exchange of data with the IC card, characterized in loading, to such an IC card, the program including following steps of:

storing the data regarding the input number of playing times of the game to the data store unit;

acquiring values which are different in the timings depending on the timing of the user input through the input/output interface and then judging the result of play of the game based on the predetermined algorithm depending on the values different in the timings and then outputting the result of play;

accumulating the point assigned to the game to the point data on the data store unit depending on the result of play of the game result;

storing the log data regarding game play to the log data store unit of the data store unit; and subtracting the number of playing times of the game.

(4) An application load terminal:

An IC card terminal enabling exchange of data with the IC card, characterized in loading, to such an IC card, the program including following steps of:

displaying on the display area the game play schedule corresponding to a kind of the game stored in the IC card;

transmitting the user input data to the IC card;

receiving the result of play of the game from the IC card; and displaying a result of the game on the display area of terminal.

As will be explained below, it is apparent that the profiles of combination of the server and shop terminal are also included in the present invention as the game service providing system.

Game service providing system using an IC card comprising the game management server and an IC card terminal for issuing the games, characterized in that the game management server receives, from the IC card terminal, the log data regarding issuance of the game pattern to the IC card and playing of the game by the user, generates the game parameter defining the winning probabilities of the game and points of the game based on the data analyzed depending on the result of analysis of the log data and then transmits the game parameters generated to the IC card terminal, while the IC card terminal generates the game pattern depending on the predetermined algorithm based on the game parameter received from the game management server, transmits such game pattern to the IC card and then also transmits, upon reception of log data regarding game play from the IC card, the log data to the game management server.

Effects of the present invention explained above are listed below.

First, according to the IC card to be realized by the present invention;

(1) A game of a type having the game pattern:

A user can enjoy the game having complicated pattern with only a card by playing the game within the IC card through comparison of the game pattern stored in the IC card and user input. A user can get different results which cannot be expected by assuring that a user cannot previously expect the game pattern.

(2) A game of a type which does not have game pattern and provides the result depending on the user input timing:

Security of the game can be improved, in addition to (1) because the game pattern is intrinsically not provided.

(3) Presentation to the user of the intermediate process of the game result:

Excitation and pleasure of the user may be raised because not only the final result of the game but also the intermediate process are presented to a user on the real-time basis.

(4) A gain may be varied depending on playing of the game result:

Since the gain having the value which may be exchanged with goods later is interrelated with the points accumulated, motivation of the user to try to play the game will be raised.

Next, according to the IC card terminal to be realized by the present invention;

(5) A terminal to be manipulated by the user side:

A user can enjoy the game any time and any where he/she wants.

(6) Shop terminal for transmitting the game pattern, game parameter and program execution right data to the IC card:

A user can enjoy the different game every time.

(7) A shop terminal for collecting game play log data:

Management of the game system by the administrator can be realized easily and flexible game issuance can be made depending on the game play log data on user.

Finally, according to the system management server realized by the present invention, (8) A management server for administrating parameters based on the log data:

Distribution of values in the game system by the system administrator can be detected and it is now possible for the system administrator to realize management of parameters with flexibility by adding not only the game play log data on user but also the other factors.

Meaning of loading the games as the application of the IC card system can be summarized again as follow:

(1) Flexible setting of questions and gain can be made due to higher calculating capability and the game which a user can enjoy interactively can be realized.

(2) Because of realization of higher security and anti-tampering property, alteration and forgery can be prevented and reliability of the game system can also be improved, enabling presentation of the prize of higher amount of money and exchange with the goods having higher values of money.

(3) Since the application program is loaded on the card, if the card itself is provided, a user can enjoy the game with the card itself without connection to the network and a user can naturally enjoy the game through connection with the network as required.

(4) Security can be assured and communication cost can also be lowered by storing the other applications such as the point system (or electronic money system) in the same card as the IC card for the purpose of incorporation.

Moreover, in order to load the game application to the IC card system, log data and management information such as various parameters are given to the system operation server and each IC card and generation of the game can be administrated with such management information. Thereby, safe and flexible system management can be realized.

Accordingly, the game application can safely be introduced into the IC card system, and thereby a user intentionally thinks to use the IC card more positively resulting in further spreading of the IC card system.

What is claimed is:

1. An IC card applicable to a point system, which issues merit points each having a value same as money depending on use of the IC card to purchase a product or service, comprising:

an input/output interface for exchanging data through connection with a terminal;

a memory for storing a plurality of application programs, an accumulated merit point value and other data; and a processor for executing the application programs, wherein the memory stores, as one of the application programs, a game application including:

a first routine of preparing in the memory a game pattern to be used to judge a result of a game when the game is played by a user, said game pattern being prepared when the IC card is coupled with one of a plurality of shop terminals in association with the point system via the input/output interface to the memory;

a second routine of displaying a game screen corresponding to the game pattern on a display of a user terminal which is independent from the shop terminals and coupled with the IC card via the input/output interface, a third routine of receiving user input data from the user terminal via the input/output interface, judging the result of a game corresponding to the game screen by evaluating the user input data based on the game pattern stored in the memory, and accumulating a game point value issued depending on the result of the game in the memory, and a fourth routine of invalidating the game pattern having been played by the user, and recording log data with respect to the game pattern which has been played, wherein the first routine always prepares a new game pattern different from that indicated by the log data.

2. The IC card according to claim 1, wherein the first routine selects, according to said log data, at least one game pattern to be stored in the memory from among game patterns supplied from one of the shop terminals connected to the input/output interface.

3. The IC card according to claim 2, wherein the game pattern to be stored in the memory is supplied in a form of ciphered data from the shop terminal via the input/output interface and stored in the memory after having been deciphered by the first routine.

4. The IC card according to claim 1, wherein the first routine prepares a plurality of different game patterns in the memory depending on the value of coupon data limiting the number of playing times of the game, said coupon data being supplied from the shop terminal through the input/output interface depending on a merit point newly issued to the IC card by said point system.

5. The IC card according to claim 4, wherein each of the game patterns is generated based on random number generated in the IC card.

6. The IC card according to claim 4, wherein each of the game patterns is generated based on game parameter data designed from the shop terminal, said game parameter data defining winning probabilities of the game or a game point to be issued to the user depending on the result of the game.

7. The IC card according to claim 1, wherein the game pattern comprises a set of a question to be displayed in the game screen and an answer to be replied by the user to the displayed question.

8. The IC card according to claim 1, wherein said game application further includes:

a fifth routine of ciphering the game pattern to back up the game pattern in a storage outside of the IC card coupled through the input/output interface, and storing again the game pattern in the memory after deciphering received game pattern when the backup game pattern is received through the input/output interface later, in response to a user request.

9. The IC card according to claim 1, wherein the second routine includes a display data control routine to display a sequence of different game screens according to the progress of the game, at least one of the game screens corresponding to a part of the game pattern selectively extracted from the game pattern.

10. The IC card according to claim 9, wherein said display data control routine selects a part of the game pattern and generates display data of one of said game screens in response to a parameter received from the user terminal with which the IC card is coupled via the input/output interface, said parameter designating which part of the game screen should be changed according to user input data on the display.

11. The IC card according to claim 1, wherein the game application further includes:

a routine of reducing at least a part of the accumulated game point value for exchanging a service designated by the user.

12. The IC card according to claim 1, wherein the third routine accumulates said game point value as said merit point value in the memory.

13. The IC card according to claim 12, wherein the game application further includes:

a routine of reducing at least a part of the accumulated merit point value for exchanging a service designated by the user.

14. The IC card according to claim 12, wherein said memory further stores a point management application program for conducting management of the game point value, and said game application further has a routine for requesting the point management application program to change the game point value to be issued depending on the result of the game.

15. The IC card according to claim 1, wherein said memory stores electronic money application program for management of electronic money, and said game application further includes a routine for requesting the electronic money application program to exchange the value of the accumulated game point for electronic money value.

* * * * *